US00RE50086E

(19) United States
(12) Reissued Patent
Babcock et al.

(10) Patent Number: US RE50,086 E
(45) **Date of Reissued Patent: *Aug. 20, 2024**

(54) UNCONVENTIONAL RESERVOIR ENHANCED OR IMPROVED OIL RECOVERY

(71) Applicants: Linde Aktiengesellschaft, Munich (DE); John A. Babcock, Houston, TX (US)

(72) Inventors: John A. Babcock, Houston, TX (US); Charles P. Siess, III, Conroe, TX (US); Kevin G. Watts, Spring, TX (US); Roberta Watts, Smithville, TX (US)

(73) Assignees: John A. Babcock, Houston, TX (US); Linde Aktiengesellschaft, Munich (DE)

( * ) Notice: This patent is subject to a terminal disclaimer.

(21) Appl. No.: 17/359,161

(22) Filed: Jun. 25, 2021

Related U.S. Patent Documents

Reissue of:
(64) Patent No.: 10,570,715
Issued: Feb. 25, 2020
Appl. No.: 15/680,714
Filed: Aug. 18, 2017

(51) Int. Cl.
*E21B 43/16* (2006.01)
*C09K 8/58* (2006.01)
(Continued)

(52) U.S. Cl.
CPC ..... *E21B 43/164* (2013.01); *C09K 8/58* (2013.01); *C09K 8/584* (2013.01); *C09K 8/594* (2013.01); *E21B 43/16* (2013.01); *E21B 43/166* (2013.01); *E21B 43/168* (2013.01); *E21B 43/20* (2013.01); *E21B 43/2605* (2020.05); *E21B 43/305* (2013.01); *C09K 2208/10* (2013.01)

(58) Field of Classification Search
CPC ..... E21B 43/164; E21B 43/16; E21B 43/168; E21B 43/166; E21B 43/20; E21B 43/26; E21B 43/305; C09K 8/584; C09K 8/58; C09K 8/594; C09K 2208/10
See application file for complete search history.

(56) References Cited

U.S. PATENT DOCUMENTS 3,035,637 A 5/1962 Allen ..... C09K 8/58 166/401
3,316,965 A 5/1967 Watanabe ..... E21B 43/267 166/280.1
(Continued)

FOREIGN PATENT DOCUMENTS

CN 201885591 U 6/2011
DE 102014010105 A1 1/2016
(Continued)

OTHER PUBLICATIONS

Australian Examination Report dated Oct. 4, 2017, corresponding to Application No. 2015336280 (Year: 2017).*
(Continued)

*Primary Examiner* — William C Doerrler
(74) *Attorney, Agent, or Firm* — Patterson + Sheridan, LLP

(57) ABSTRACT

A method of enhanced oil recovery from an unconventional resource reservoir comprises injecting an enhanced recovery fluid into the unconventional resource reservoir via an injection well and producing hydrocarbons from the unconventional resource reservoir via the injection well or a production well offset from the injection well.

70 Claims, 15 Drawing Sheets

(51) Int. Cl.

| | |
|---|---|
| ***C09K 8/584*** | (2006.01) |
| ***C09K 8/594*** | (2006.01) |
| ***E21B 43/20*** | (2006.01) |
| ***E21B 43/26*** | (2006.01) |
| ***E21B 43/30*** | (2006.01) |

(56) References Cited

U.S. PATENT DOCUMENTS 3,319,712 A 5/1967 O'Brien ..... E21B 43/30 166/245
3,368,627 A 2/1968 Hurst et al. ..... E21B 43/168 166/308.2
4,223,728 A * 9/1980 Pegg ..... C10G 9/00 166/266
4,490,985 A 1/1985 Wells ..... B01D 53/263 62/93
4,511,381 A 4/1985 Mehra ..... C07C 7/11 95/177
4,557,330 A * 12/1985 Fussell ..... E21B 43/168 166/402
4,576,005 A 3/1986 Force ..... F01K 23/064 123/3
4,589,276 A * 5/1986 Djabbarah ..... E21B 43/164 73/60.11
6,230,814 B1 5/2001 Nasr et al. ..... E21B 43/2406 166/263
7,373,790 B2 5/2008 Clare et al. ..... F25J 3/0209 62/927
7,527,096 B2 5/2009 Chung et al. ..... E21B 43/305 166/263
8,505,332 B1 8/2013 Prim ..... C07C 7/04 585/818
8,844,639 B2 9/2014 Gupta et al. ..... E21B 43/2406 166/272.3
9,488,040 B2 11/2016 Chakrabarty et al. .. E21B 43/16
9,534,836 B2 1/2017 Dubettier-Grenier et al. ..... F25J 3/04121
9,725,644 B2 8/2017 Babcock et al. ..... E21B 43/267
2005/0189112 A1 9/2005 Taylor et al. ..... C09K 8/82 166/308.4
2006/0243437 A1 11/2006 Albers et al. ..... E21B 43/164 166/308.4
2006/0289157 A1* 12/2006 Rao ..... E21B 43/168 166/50
2006/0289166 A1 12/2006 Stromquist et al. .. E21B 43/267 166/305.1
2007/0000666 A1 1/2007 Vozniak et al. ..... E21B 43/267 166/308.1
2007/0187340 A1 8/2007 Oresti et al. ..... E21B 43/40 210/806
2008/0087041 A1 4/2008 Denton et al. ..... F25J 3/0238 62/619
2010/0032171 A1 2/2010 Bali et al. ..... E21B 43/16 166/402
2012/0000660 A1 1/2012 Gatlin et al. ..... C09K 8/64 556/148
2012/0037370 A1 2/2012 Johnson ..... E21B 43/40 166/57
2012/0047942 A1 3/2012 Kolodziej ..... F25J 3/0242 62/51.1
2013/0168086 A1 7/2013 Roberts ..... E21B 43/267 166/250.01
2013/0199774 A1 8/2013 Sultenfuss et al. ... E21B 43/164 166/248
2013/0213085 A1 8/2013 Ward ..... C10G 7/00 62/618
2013/0220605 A1 8/2013 Vandor ..... C09K 8/62 166/305.1
2013/0228330 A1 9/2013 Loree et al. ..... E21B 43/34 166/57
2013/0299167 A1 11/2013 Fordyce et al. ..... E21B 43/26 166/305.1
2014/0000899 A1 1/2014 Nevison ..... E21B 43/26 166/308.1
2014/0124208 A1 5/2014 Loree et al. ..... E21B 43/26 166/308.1
2014/0174747 A1 6/2014 Kelly et al. ..... E21B 43/267 366/152.2
2014/0366577 A1 12/2014 Zubrin et al. ..... C10L 3/10 62/619
2015/0021022 A1 1/2015 Ladva et al. ..... C09K 8/805 166/276
2015/0060075 A1 3/2015 Blom et al. ..... C09K 8/594 166/307
2015/0152318 A1 6/2015 Travis ..... E21B 27/02 166/280.1
2015/0167550 A1 6/2015 Vandervort et al. ..... F02C 3/20 60/39.12
2015/0184932 A1 7/2015 Higginbotham et al. ..... F25J 3/0209 62/620
2015/0198027 A1* 7/2015 Wickramathilaka ... C09K 8/592 166/272.3
2015/0233222 A1 8/2015 Teklu et al. ..... E21B 43/166 166/305.1
2015/0368566 A1 12/2015 Young et al. ..... C10L 3/106 700/273
2016/0069171 A1 3/2016 Stancliffe et al. .... E21B 43/305 166/50
2016/0122628 A1* 5/2016 Babcock ..... C09K 8/80 166/305.1
2016/0238313 A1 8/2016 Shotts ..... C10L 3/12
2016/0280607 A1 9/2016 Land et al. ..... C04B 35/571
2017/0044425 A1 2/2017 Barati Ghahfarokhi ..... C09K 8/703
2017/0218742 A1 8/2017 Babcock et al. ... B01D 17/0208
2017/0218743 A1 8/2017 Babcock et al. ..... E21B 43/34
2017/0275520 A1 9/2017 Babcock et al. ..... C09K 8/64
2017/0275521 A1 9/2017 Babcock et al. ..... C09K 8/703
2017/0275526 A1 9/2017 Babcock et al. ..... C09K 8/58
2017/0292057 A1 10/2017 Babcock et al. ..... C09K 8/94
2017/0292059 A1 10/2017 Babcock et al. ..... C09K 8/584
2017/0292354 A1 10/2017 Babcock et al. ..... E21B 43/16
2017/0298268 A1 10/2017 Babcock et al. ..... E21B 47/00
2018/0265769 A1* 9/2018 Nevison ..... E21B 43/166

FOREIGN PATENT DOCUMENTS

FR 2466606 A1 * 4/1981
GB 2219818 A * 12/1989
JP 2015030908 A2 * 2/2015
JP 2016064645 A1 * 4/2016
WO WO9804807 A1 * 2/1998
WO WO2010025540 A1 * 3/2010
WO WO2012097424 A1 * 7/2012
WO WO2015020654 A1 * 2/2015
WO 2015030908 A2 3/2015
WO 2016064645 A1 4/2016

OTHER PUBLICATIONS

Ginley, "Osudo Reservoir Fluid Study Jordan B No. 1 Well", http:/ocdimage.emnrd.state.nm.us/imaging/filestore/SantaFeAdmin/CF/ADA-03-00539Case Flles Part 6/10796_4159.pdf, pp. 1,5;table 2, Jan. 1, 1992. (Year: 1992).*

Holtz et al., "Summary Integrated Geologic and Engineering Determination of Oil-Reserve-Growth Potential in Carbonate Reservoirs", https:www.onepetro.org/download/journal-paper/SPE-22900-PA?id=journal-paper/SPE-22900-PA, p. 1250 and 1253, Jan. 1, 1992. (Year: 1992).*

International Invitation to Pay Additional Fees dated Feb. 13, 2017, corresponding to Application No. PCT/US2016/063132. (Year: 2017).*

International Invitation to Pay Additional Fees dated Apr. 10, 2017, corresponding to Application No. PCT/US2017/012561. (Year: 2017).*

(56) References Cited

OTHER PUBLICATIONS

International Search Report and Written Opinion dated Jan. 8, 2016, corresponding to Application No. PCT/US2015/055627. (Year: 2016).*
International Search Report and Written Opinion dated Feb. 7, 2017, corresponding to Application No. PCT/US2016/063140. (Year: 2017).*
International Search Report and Written Opinion dated Feb. 7, 2017, corresponding to Application No. PCT/US2016/063148. (Year: 2017).*
International Search Report and Written Opinion dated Mar. 29, 2017, corresponding to Application No. PCT/US2016/067454. (Year: 2017).*
International Search Report and Written Opinion dated Mar. 30, 2017, corresponding to Application No. PCT/US2016/067458. (Year: 2017).*
International Search Report and Written Opinion dated Apr. 4, 2017, corresponding to Application No. PCT/US2017/012566. (Year: 2017).*
International Search Report and Written Opinion dated May 10, 2017, corresponding to Application No. PCT/US2016/063127. (Year: 2017).*
International Search Report and Written Opinion dated May 10, 2017, corresponding to Application No. PCT/US2016/063132. (Year: 2017).*
International Search Report and Written Opinion dated Jun. 7, 2017, corresponding to Application No. PCT/US2017/012561. (Year: 2017).*
International Search Report and Written Opinion dated Sep. 21, 2017, corresponding to Application No. PCT/US2017/014696. (Year: 2017).*
International Search Report and Written Opinion dated Nov. 7, 2017, corresponding to Application No. PCT/US2017/019619. (Year: 2017).*
Nakashima et al., "SPE-177801-MS Development of a Giant Carbonate Oil Field, Part 2: Mitigation from Pressure Maintenance Development to Sweep Oriented IOR Development", http/www.onepetro.org/download/conference-~aper/SPE-177801-MS?id=conference-paper/SPE-177801-MS, pp. 1-8 and 12-16, Jan. 1, 2015. (Year: 2015).*
Pazuki etal., "A modified Flory-Huggins model for prediction of asphaltenes precipitation in crude oil", Fuel, IPC Science and Technology Press, Guildford, GB, vol. 85, No. 7-8, pp. 1083-1086, May 1, 2016. (Year: 2016).*
Qing Sun et al., "Quantification of uncertainty in recovery efficiency predictions: lessons learned from 250 mature corbonate fields", SPE 84459, pp. 1-15, Jan. 1, 2005. (Year: 2005).*
S. Rassenfoss; In Search of the Waterless Fracture, JPT, Jun. 30, 2013, pp. 46-54, XP055237780. (Year: 2013).*
Australian Examination Report dated Oct. 4, 2017, corresponding to Application No. 2015336280.
M. Asadi et al., "Water-Free Fracturing: A Case History", Society of Petroleum Engineers, SPE-175988-MS, 14 Pages.

* cited by examiner

UNCONVENTIONAL RESERVOIR ENHANCED OR IMPROVED OIL RECOVERY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Field

Embodiments of the disclosure relate to enhanced oil recovery techniques in unconventional resource plays.

Description of the Related Art

Unconventional resource plays are ushering in a new era for oil and gas production. The term "resource play" refers to a relatively large hydrocarbon play located over a broad geographical area. In a resource play, the geological likelihood of encountering a hydrocarbon generation window having a conventional hydrocarbon bearing reservoir, a seal (or other type of trapping mechanism) to contain the hydrocarbons in the reservoir, and an organic rich source rock from which the hydrocarbons are generated is nearly certain. Resource plays have been described as statistical plays in which an operator can expect fairly repeatable results if enough wells are drilled. The term "unconventional" refers to hydrocarbons that have been bypassed by conventional oil and gas recovery techniques because the hydrocarbons were not considered economically feasible to produce as a result of low permeability and associated uneconomical production rates.

Typically, these unconventional resource plays contain hydrocarbons in a reservoir that is not favorable for economical production. Some typical methods for producing hydrocarbons from these types of reservoirs include injection of a gas, water (in liquid or gas phase), or a combination thereof. However, primary hydrocarbon production from these reservoirs has been reported to be as low as 3% of the original-oil-in-place, thereby leaving up to 97% of the hydrocarbons in place when the reservoir is abandoned.

Therefore, there is a need for new and improved enhanced oil recovery techniques that can be applied to unconventional resource reservoirs.

SUMMARY

Embodiments of the disclosure relate to enhanced oil recovery techniques in unconventional resource plays.

In one embodiment, a method for enhanced or improved hydrocarbon recovery comprises injecting an enhanced or improved recovery fluid through an injection well into an unconventional resource reservoir to mobilize hydrocarbons, wherein the enhanced or improved recovery fluid comprises an unfractionated hydrocarbon mixture that is a byproduct of a condensed and de-methanized hydrocarbon stream that is miscible with hydrocarbons in the unconventional resource reservoir, wherein the unfractionated hydrocarbon mixture is condensed out of the hydrocarbon stream at a temperature at or below 0 degrees Fahrenheit, wherein the unfractionated hydrocarbon mixture comprises ethane, propane, and butane in an amount of at least 75% by volume, and wherein the unfractionated hydrocarbon mixture comprises pentane plus in an amount less than 25% by volume, and producing hydrocarbons from the unconventional resource reservoir via the injection well or a production well offset from the injection well.

In some embodiments, the method further comprises alternating slugs of Y-Grade NGL and a gas as an enhanced or improved recovery fluid.

In some embodiments, the method further comprises alternating slugs of Y-Grade NGL and water as an enhanced or improved recovery fluid, wherein the water maybe viscosifed and may be comprised of brine, seawater, formation water, or inhibited fresh water as an enhanced or improved recovery fluid.

In some embodiments, the method further comprises injecting the alternating slugs of Y-Grade NGL and viscosified water above the formation fracture pressure as an enhanced or improved recovery fluid.

In some embodiments, the method further comprises injecting the alternating slugs of Y-Grade NGL and a gas above the formation fracture pressure as an enhanced or improved recovery fluid.

In some embodiments, the method further comprises injecting nanoparticles with the enhanced or improved recovery fluid.

In some embodiments, the method further comprises mixing the unfractionated hydrocarbon mixture with a surfactant and a gas to form a hydrocarbon foam as the enhanced or improved recovery fluid.

In some embodiments, the method further comprises mixing the unfractionated hydrocarbon mixture with a surfactant, a gas, and water to form an emulsion based foam as the enhanced or improved recovery fluid.

In some embodiments, the method further comprises mixing the unfractionated hydrocarbon mixture with an emulsifying agent and water to form an emulsion as the enhanced or improved recovery fluid.

In one embodiment, a method for enhanced or improved hydrocarbon recovery comprises mixing an unfractionated hydrocarbon mixture with a chemical agent to form an enhanced or improved recovery fluid, wherein the unfractionated hydrocarbon mixture is a byproduct of a condensed and de-methanized hydrocarbon stream that is miscible with hydrocarbons, wherein the unfractionated hydrocarbon mixture is condensed out of the hydrocarbon stream at a temperature at or below 0 degrees Fahrenheit, wherein the unfractionated hydrocarbon mixture comprises ethane, propane, and butane in an amount of at least 75% by volume, and wherein the unfractionated hydrocarbon mixture comprises pentane plus in an amount less than 25% by volume, injecting the enhanced or improved recovery fluid through an injection well into an unconventional resource reservoir, and producing hydrocarbons from the unconventional resource reservoir via the injection well or a production well offset from the injection well.

In some embodiments, the method further comprises adding a secondary fluid to the enhanced or improved recovery fluid.

In one embodiment, a method for enhanced or improved hydrocarbon recovery comprises injecting an unfractionated hydrocarbon mixture through an injection well into an unconventional resource reservoir, wherein the unfractionated hydrocarbon mixture is a byproduct of a condensed and de-methanized hydrocarbon stream that is miscible with hydrocarbons, wherein the unfractionated hydrocarbon mixture is condensed out of the hydrocarbon stream at a temperature at or below 0 degrees Fahrenheit, wherein the unfractionated hydrocarbon mixture comprises ethane, propane, and butane in an amount of at least 75% by volume, and wherein the unfractionated hydrocarbon mixture comprises pentane plus in an amount less than 25% by volume, and producing hydrocarbons from the unconventional resource reservoir via the injection well or a production well offset from the injection well.

Figure 1:
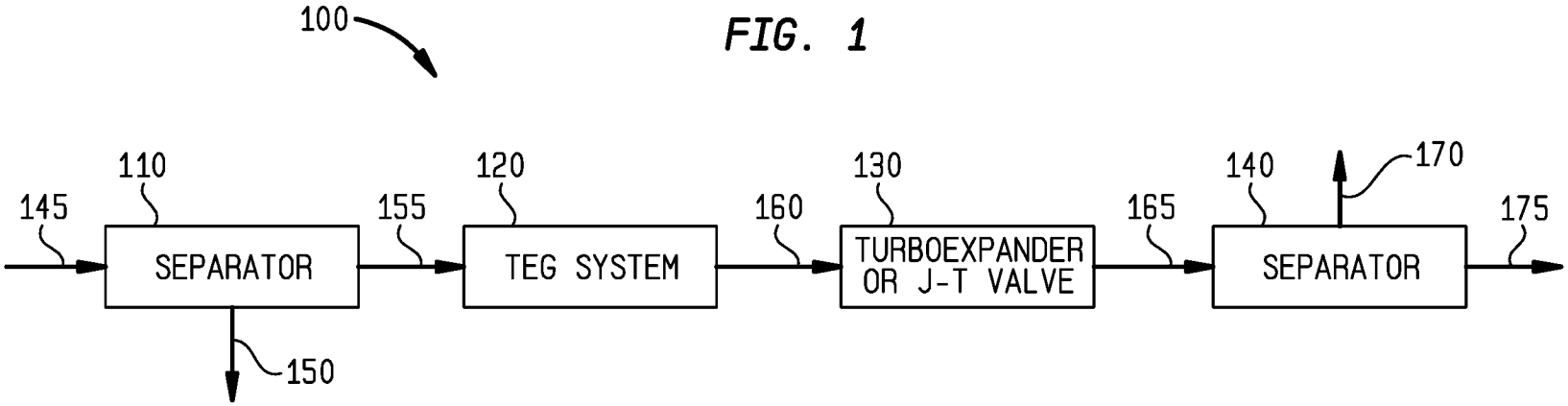
FIG. 1 is a schematic view of a system for obtaining Y-Grade NGL, according to one embodiment.

It is contemplated that elements disclosed in one embodiment may be beneficially utilized on other embodiments without specific recitation.

DETAILED DESCRIPTION

The methods and systems described herein provide enhanced oil recovery techniques (either miscible or immiscible processes) for use in unconventional resource reservoirs, including the injection of enhanced recovery fluids that are naturally occurring and are locally available as a low cost approach and that are able to reduce and/or eliminate the interfacial tension between residual oil-in-place and the enhanced recovery fluids and to solubilize or partially solubilize entrained kerogen in unconventional reservoirs. The enhanced recovery fluids can be used for enhanced or improved oil recovery. One type of enhanced recovery fluid comprises an unfractionated hydrocarbon mixture, such as Y-Grade natural gas fluids (referred to herein as Y-Grade NGL). Other types of enhanced recovery fluids comprise Y-Grade NGL, nitrogen, carbon dioxide, methane, ethane, water, viscosifed water, or any combination thereof. In one embodiment, the viscosified water may comprise adding a water-soluble co-polymer with water to increase the viscosity of the water.

In an unconventional resource reservoir, the hydrocarbon bearing reservoir, the seal, and the organic rich source rock that are in the hydrocarbon generation window are one and the same. A separate seal or other type of trapping mechanism is not usually required. Because unconventional resource reservoirs do not require conventional hydrocarbon bearing reservoir quality rock (e.g. high porosity and permeability rock) with favorable structural positions, large areas of unconventional resource reservoirs are potentially prospective. As a result, it is not unusual to see hundreds of thousands of acres of resource plays having unconventional resource reservoirs leased prior to drilling. To exploit the unconventional resource reservoirs requires the application of multi-stage hydraulic fracturing and tightly spaced vertical wells and/or horizontal wells with laterals of several thousand feet in length.

The production behavior of liquid-rich unconventional resource reservoirs (e.g. unconventional resource reservoirs predominantly having liquid hydrocarbons compared to gaseous hydrocarbons) is primarily a function of the rock properties, the fluid properties, and the type of hydraulic fracturing operation that was performed. The key parameters include fracture half length, spacing and conductivity, critical gas saturation, flowing bottom-hole pressure, and formation matrix permeability.

One type of enhanced recovery fluid comprises Y-Grade NGL only. Another type of enhanced recovery fluid comprises Y-Grade NGL and water. Another type of enhanced recovery fluid comprises Y-Grade NGL and viscosified water. Another type of enhanced recovery fluid comprises an emulsion of Y-Grade NGL, surfactant, water, and optionally a polymer. Another type of enhanced recovery fluid comprises a foam of Y-Grade NGL, surfactant, nitrogen, water, and optionally a polymer. Another type of enhanced recovery fluid comprises a mixture of Y-Grade NGL and a polymer. Another type of enhanced recovery fluid comprises a gas, including nitrogen, carbon dioxide, methane, ethane, or any combination thereof. Other types of enhanced recovery fluids comprise any combination of enhanced recovery fluid disclosed herein. Any type of enhanced recovery fluid disclosed herein can be used with any of the embodiments described below with respect to FIGS. 2-15.

The enhanced recovery fluids can be continuously injected into an unconventional resource reservoir with another fluid, such as nitrogen, carbon dioxide, ethane, and/or methane. The enhanced recovery fluids can be alternately injected into an unconventional resource reservoir with another fluid, such as a gas comprising at least one of nitrogen, carbon dioxide, ethane, LNG, and/or methane. A slug of the enhanced recovery fluids can be injected into an unconventional resource reservoir followed by a final displacement fluid, wherein the final displacement fluid comprises at least one of a gas, water, and viscosified water and is injected at a pressure at, above, or below the unconventional resource reservoir fracture pressure. The enhanced recovery fluids disclosed herein are excellent solvents and can improve mobility and conformance of the hydrocarbons within unconventional resource reservoirs.

Y-Grade NGL is an unfractionated hydrocarbon mixture comprising ethane, propane, normal butane, isobutane, and pentane plus. Pentane plus comprises pentane, isopentane, and/or heavier weight hydrocarbons, for example hydrocarbon compounds containing at least one of C5 through C8+. Pentane plus may include natural gasoline. The Y-Grade NGL composition may vary according to the unconventional or conventional reservoir that it is sourced.

Typically, Y-Grade NGL is a by-product of condensed and de-methanized hydrocarbon streams that are produced from shale wells for example and transported to a centralized facility where the hydrocarbon stream is cooled to a temperature at or below 0 degrees Fahrenheit to condense out an unfractionated hydrocarbon mixture comprising ethane, propane, normal butane, isobutane, and pentane. The hydrocarbon streams are de-methanized to have a methane content of less than 1% or less than 0.5% by liquid volume. Y-Grade NGL can be locally sourced from a splitter facility, a gas plant, and/or a refinery and transported by truck or pipeline to a point of use. In its un-fractionated or natural state (under certain pressures and temperatures, for example within a range of 250-600 psig and at wellhead or ambient temperature), Y-Grade NGL has no dedicated market or known use. Y-Grade NGL must undergo processing before its true value is proven.

FIG. 1 is a schematic view of a system 100 for obtaining Y-Grade NGL, according to one embodiment, for use with embodiments described herein. The system 100 includes a first separator 110, a triethylene glycol ("TEG") system 120, a turboexpander 130 (or alternatively a Joule-Thompson valve), and a second separator 140. A hydrocarbon stream 145, such as a wet natural gas stream, flows into the first separator 110 where it is separated into a liquid stream 150 and a gas stream 155. The liquid stream 150 comprises liquid hydrocarbons and water. The gas stream 155 flows into the TEG system 120 where water vapor is removed to dehydrate the gas stream 155. A dehydrated gas stream 160 exiting the TEG system 120 flows into the turboexpander 130 (or alternatively the Joule-Thompson valve), which cools the gas stream 160 to a temperature at or below 0 degrees Fahrenheit, for example to a temperature between 0 degrees Fahrenheit and −100 degrees Fahrenheit, for example about −30 degrees Fahrenheit.

The gas stream 160 is cooled to a temperature at or below 0 degrees Fahrenheit to condense out Y-Grade NGL from the remaining gas stream, which is primarily methane. Cooled fluids 165 flow into the second separator 140 where a gas stream 170, which is primarily methane, is separated out from Y-Grade NGL 175. As a result, the Y-Grade NGL 175 is a byproduct of the condensed and de-methanized hydrocarbon stream 145.

In one embodiment, the gas stream 175 may also comprise ethane in an amount of about 1 percent to about 50 percent by total volume. The amount of ethane separated out with the methane can be controlled by the pressure maintained in the second separator 140. As the pressure is lowered in the second separator 140, the ethane content of the gas stream 170 is increased, and the ethane content of the Y-Grade NGL 175 is decreased. The Y-Grade NGL 175 may be used to form any of the enhanced or improved oil recovery fluids and/or with any of the systems described herein.

According to one example, Y-Grade NGL comprises about 43% ethane, about 27% propane, about 7% normal butane, about 10% isobutane, and about 13% pentane plus at a maximum vapor pressure of about 600 psig at 100 degrees Fahrenheit per American Society for Testing and Materials (ASTM) according to the standard testing procedure D-6378 with methane, aromatics, and olefin maximums of 0.5% L.V. % per GPA 2177, 1.0 wt % of total stream per GPA 2186 and 1.0 L.V. % per GPA 2186, respectively.

According to one example, Y-Grade NGL comprises about 28% ethane, about 42% propane, about 13% normal butane, about 7% isobutane, and about 10% pentane plus. According to one example, Y-Grade NGL comprises about 48% ethane, about 31% propane, about 9% normal butane, about 5% isobutane, and about 7% pentane plus. According to one example, Y-Grade NGL comprises about 37%-43% ethane, about 22%-23% propane, about 7% normal butane, about 9%-11% isobutane, and about 13%-16% pentane plus. According to one example, Y-Grade NGL comprises about 10%-20% of at least one hydrocarbon compound having five carbon elements ($C_5$) or more.

Y-Grade NGL may comprise one or more combinations, as a whole or in part, of the Y-Grade NGL examples and/or embodiments described herein. The Y-Grade NGL may be utilized as a fluid that is injected into an unconventional reservoir, as a foam that is injected into an unconventional reservoir, as an emulsion that is injected into an unconventional reservoir, as an emulsion/foam that is injected into an unconventional reservoir, or as a gel that is injected into an unconventional reservoir.

The Y-Grade NGL composition can be customized for handling as a liquid under various conditions. Since the ethane content of Y-Grade NGL affects the vapor pressure, the ethane content can be adjusted as necessary. According to one example, Y-Grade NGL may be processed to have a low ethane content, such as an ethane content within a range of 3-13 percent, to allow the Y-Grade NGL to be transported as a liquid in low pressure storage vessels. According to another example, Y-Grade NGL may be processed to have a high ethane content, such as an ethane content within a range of 38-60 percent, to allow the Y-Grade NGL to be transported as a liquid in high pressure pipelines.

Y-Grade NGL differs from liquefied petroleum gas ("LPG"). One difference is that LPG is a fractionated product comprised of primarily propane, or a mixture of fractionated products comprised of propane and butane. Another difference is that LPG is a fractioned hydrocarbon mixture, whereas Y-Grade NGL is an unfractionated hydrocarbon mixture. Another difference is that LPG is produced in a fractionation facility via a fractionation train, whereas Y-Grade NGL can be obtained from a splitter facility, a gas plant, and/or a refinery. A further difference is that LPG is a pure product with the exact same composition, whereas Y-Grade NGL can have a variable composition.

In its unfractionated state, Y-Grade NGL is not an NGL purity product and is not a mixture formed by combining one or more NGL purity products. An NGL purity product is defined as an NGL stream having at least 90% of one type of carbon molecule. The five recognized NGL purity products are ethane (C2), propane (C3), normal butane (NC4), isobutane (IC4) and natural gasoline (C5+). The unfractionated hydrocarbon mixture must be sent to a fractionation facility, where it is cryogenically cooled and passed through a fractionation train that consists of a series of distillation towers, referred to as deethanizers, depropanizers, and debutanizers, to fractionate out NGL purity products from the unfractionated hydrocarbon mixture. Each distillation tower generates an NGL purity product. Liquefied petroleum gas is an NGL purity product comprising only propane, or a mixture of two or more NGL purity products, such as propane and butane. Liquefied petroleum gas is therefore a fractionated hydrocarbon or a fractionated hydrocarbon mixture.

In one embodiment, Y-Grade NGL comprises condensed, dehydrated, desulfurized, and de-methanized natural gas stream components that have a vapor pressure of not more than about 600 psig at 100 degrees Fahrenheit, with aromatics below about 1 weight percent, and olefins below about 1 percent by liquid volume. Materials and streams useful for the embodiments described herein typically include hydrocarbons with melting points below about 0 degrees Fahrenheit.

In one embodiment, Y-Grade NGL comprises a mixture of ethane, propane, and butane (normal butane and/or isobutane) in an amount of at least 75% by liquid volume of the Y-Grade NGL composition. In one embodiment, Y-Grade NGL comprises ethane in an amount of at least 3% by liquid volume of the Y-Grade NGL composition. In one embodiment, Y-Grade NGL comprises a mixture of pentane plus in an amount less than 30% by liquid volume of the Y-Grade NGL composition.

In one embodiment, Y-Grade NGL is created in a local natural gas processing plant or splitter facility as a by-product of condensing a wet de-methanized natural gas stream at a temperature at or below 0 degrees Fahrenheit. This is typically accomplished by first dehydrating the natural gas stream to remove entrapped water, and then cooling the natural gas stream by reducing the temperature below the hydrocarbon dew point temperature (at or below 0 degrees Fahrenheit for example) to thereby condense a portion of the natural gas stream into Y-Grade NGL.

In one embodiment, sweep efficiencies can be improved if Y-Grade NGL is injected into an unconventional resource reservoir in pre-defined volumes (also referred to as "slugs") that are alternated with slugs of nitrogen, carbon dioxide, ethane, water, viscosified water, and/or methane to improve the mobility of the Y-Grade NGL injected into the unconventional resource reservoir as well as the hydrocarbons in the reservoir. In one embodiment, sweep efficiencies can be improved if a slug of Y-Grade NGL is injected into an unconventional resource reservoir followed by a continuous injection of a slug of nitrogen, carbon dioxide, ethane, water, viscosified water, and/or methane to improve the mobility of the Y-Grade NGL injected into the unconventional resource reservoir as well as the hydrocarbons in the reservoir.

In one embodiment, Y-Grade NGL may be mixed with a viscosity increasing agent, such as a polymer, for example hydrocarbon soluble block co-polymers. In one embodiment, Y-Grade NGL may be mixed with a surfactant, such as a nonionic surfactant, for example silicon or fluorinated. In one embodiment, Y-Grade NGL may be mixed with the surfactant to create an emulsion, or with the surfactant and nitrogen to create a foam. In one embodiment, the viscosity increasing agent and the surfactant may be mixed with a solubilizing fluid for subsequent mixture with the Y-Grade NGL.

Figure 2:
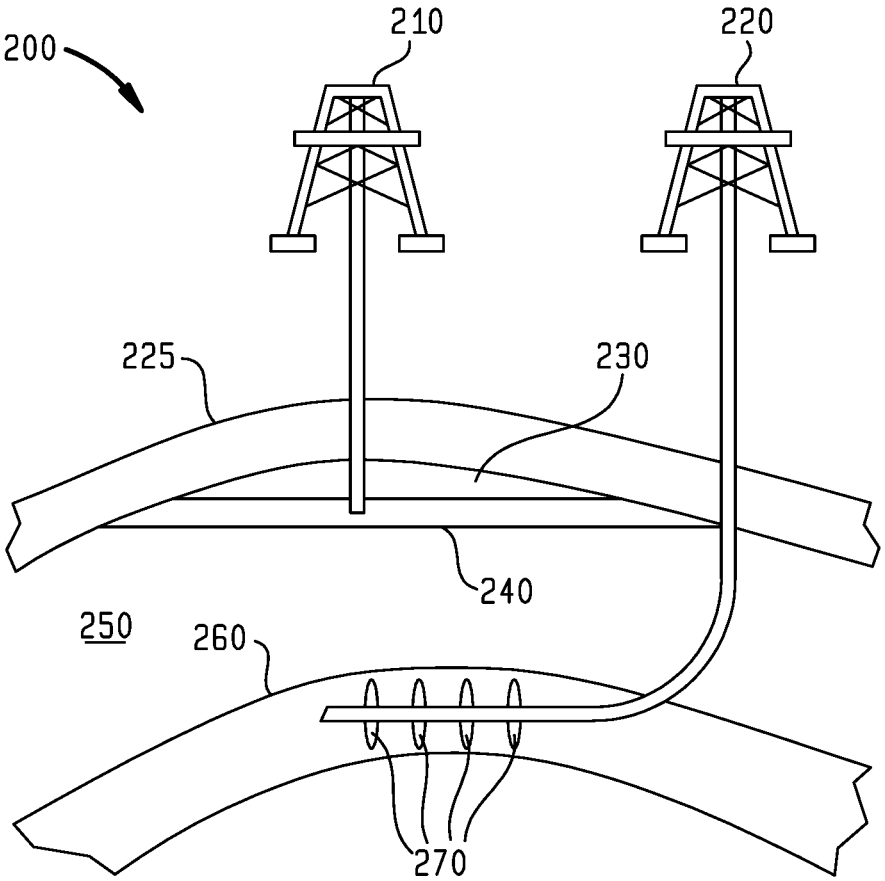
FIG. 2 is a schematic plan view of a conventional well and unconventional resource well.

FIG. 2 is a sectional view of a resource play 200 showing the difference between a conventional well 210 completed in a conventional hydrocarbon bearing reservoir and an unconventional resource well 220 completed in an unconventional resource reservoir according to one embodiment. Conventional well 210 is completed in conventional hydrocarbon bearing reservoir 250 that is sealed by formation 225 (e.g. a seal), which acts as an upper boundary to contain hydrocarbons below. Hydrocarbon bearing reservoir 250 has gas cap 230 and oil column 240 which was sourced from a source rock, such as a shale formation, and is referred to herein as an unconventional resource reservoir 260.

Unconventional resource well 220 is completed in unconventional resource reservoir 260, which acts as the hydrocarbon bearing reservoir, the seal, and the source rock all in one. The unconventional resource reservoir 260 is hydraulically fractured in stages 270 to establish economically commercial rates of hydrocarbon production. The unconventional resource reservoir 260 includes hydrocarbons that have been bypassed by conventional oil and gas recovery techniques because the hydrocarbons (e.g. residual oil) were not considered economically feasible to produce as a result of low permeability and associated uneconomical production rates.

Figure 3:
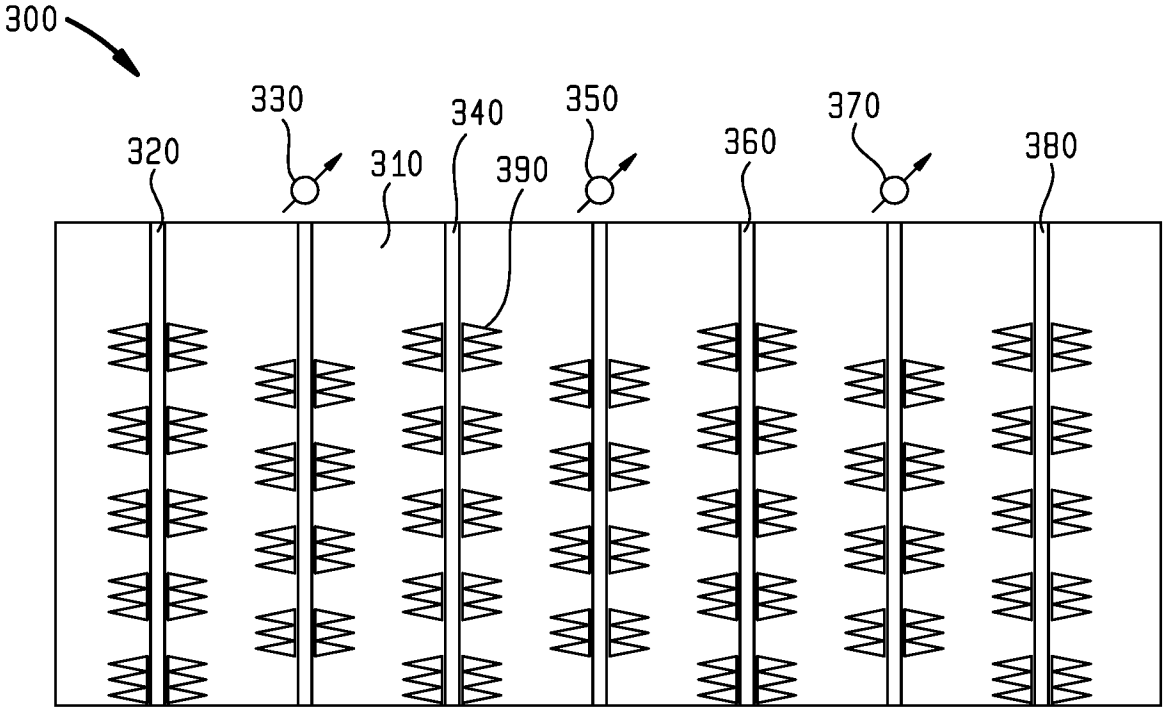
FIG. 3 is a schematic section view of an array of vertical unconventional resource wells.

FIG. 3 is a sectional view of a resource play 300 having an unconventional resource reservoir 310 completed with an array of vertical wells on a prescribed spacing pattern according to one embodiment. Unconventional resource production wells 320, 340, 360, and 380 are offset by unconventional resource injection wells 330, 350, and 370. All of the unconventional resource production and injection wells have been hydraulically fractured and have one or more sections of hydraulic fractures 390 in one or more intervals. Although shown as vertical wells, the production wells 320, 340, 360, and 380 and/or the injection wells 330, 350, and 370 can be horizontal wells. Each injection well 330, 350, and 370 has a pair of production wells that are offset from and/or located on opposite sides of the injection well 330, 350, and 370.

Figure 4:
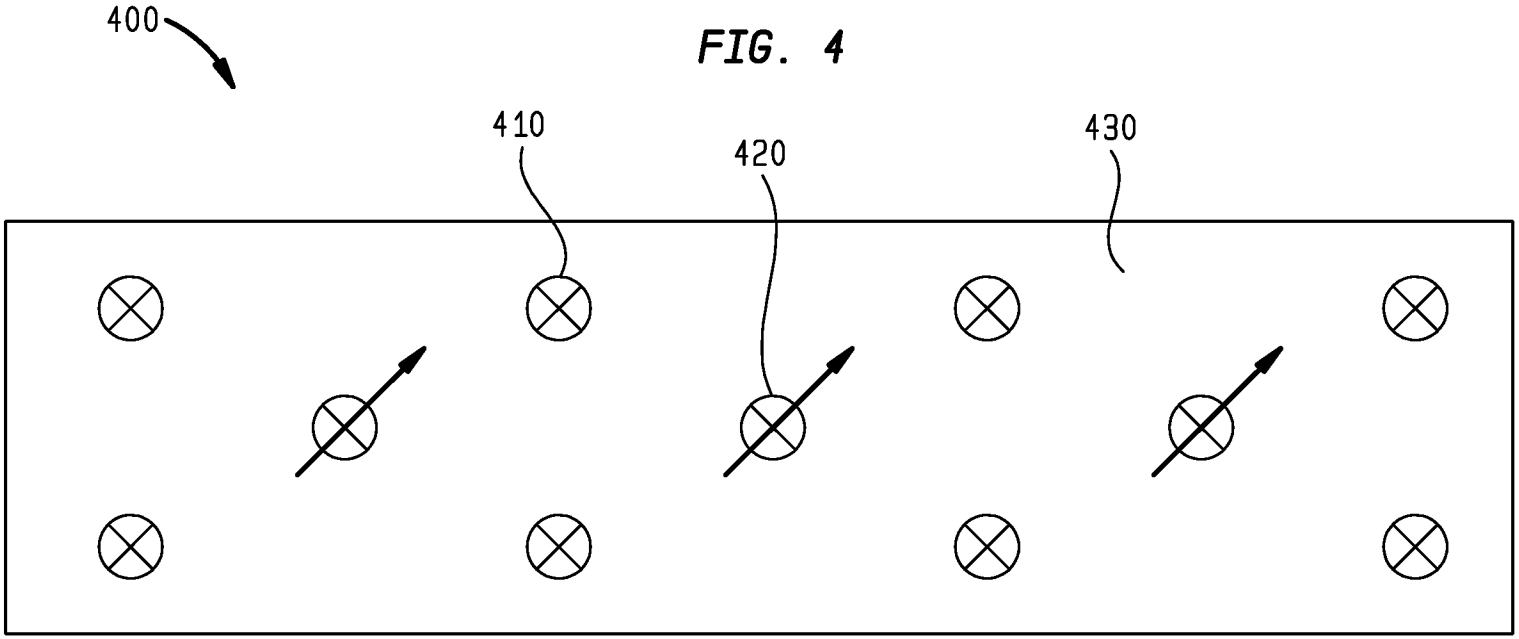
FIG. 4 is a schematic plan view of an array of unconventional resource wells.

FIG. 4 is a plan view of a resource play 400 having an unconventional resource reservoir 430 completed with an array of vertical wells on a prescribed spacing pattern according to one embodiment. Unconventional resource production wells 410 are offset from unconventional resource injection wells 420. Each unconventional resource injection well 420 may be surrounded by a cluster of unconventional resource production wells 410.

Figure 5:
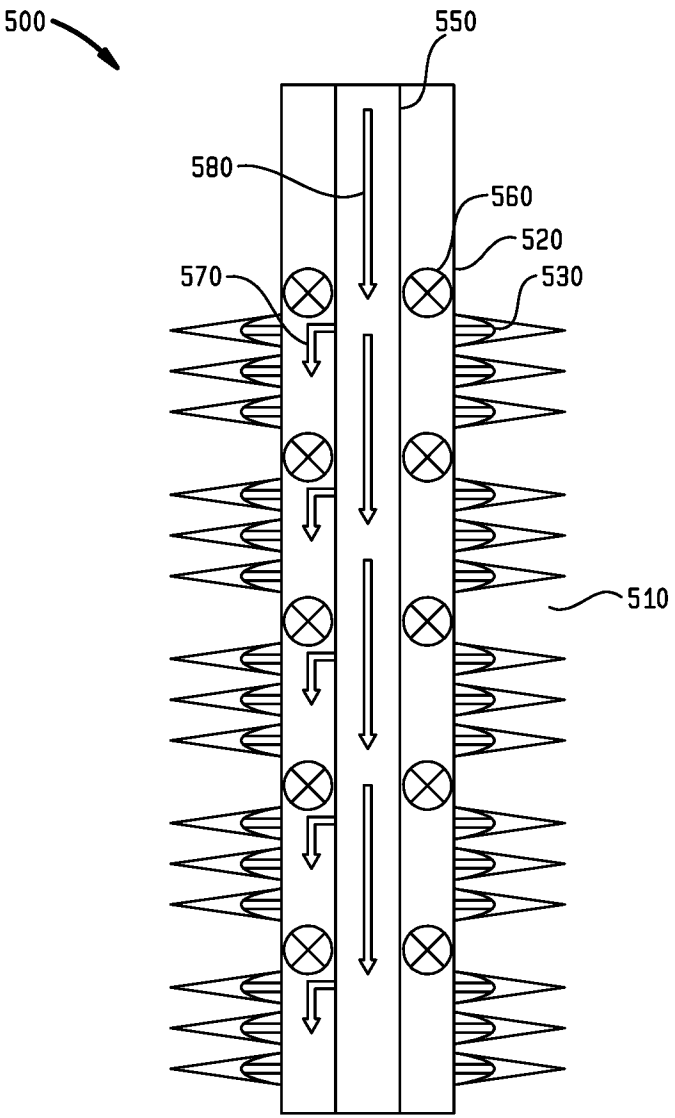
FIG. 5 is a schematic section view of a vertical unconventional resource injection well.

FIG. 5 is a sectional view of a resource play 500 having an unconventional resource reservoir 510 completed with at least one vertical or horizontal well according to one embodiment. The well is cemented with a casing string or liner string 520 through unconventional resource reservoir 510, which has been perforated and hydraulically fractured in one or more stages to create one or more sections of perforation clusters and hydraulic fractures 530 in the unconventional resource reservoir 510. An inner tubular string 550 is run into the well. Inner tubular string 550 comprises equally spaced packer assemblies comprised of isolation packers 560, and gas lift mandrels and gas lift valves 570 positioned between each packer assembly.

The packers 560 are actuated into engagement with the casing string or liner string 520 to isolate the sections of perforation clusters and hydraulic fractures 530. Injected fluid 580 enters inner tubing string 550 and flows through the gas lift mandrels and gas lift valves 570 into the isolated sections at a prescribed rate to regulate the volume of the injected fluid 580 that is injected into the unconventional resource reservoir 510 at each isolated section via the perforation clusters and hydraulic fractures 530. In this manner, the injected fluid 580 is uniformly distributed into the unconventional resource reservoir 510 at each isolated section.

In one embodiment, a chemical diverting agent can be injected into the unconventional resource reservoir 510 to temporarily block any of the perforation clusters and hydraulic fractures 530 that are high volume or have larger openings through which a larger volume of the injected fluid can flow relative to the remaining perforation clusters and hydraulic fractures 530 so that the injected fluid 580 is uniformly injected into the unconventional resource reservoir 510.

Figure 6:
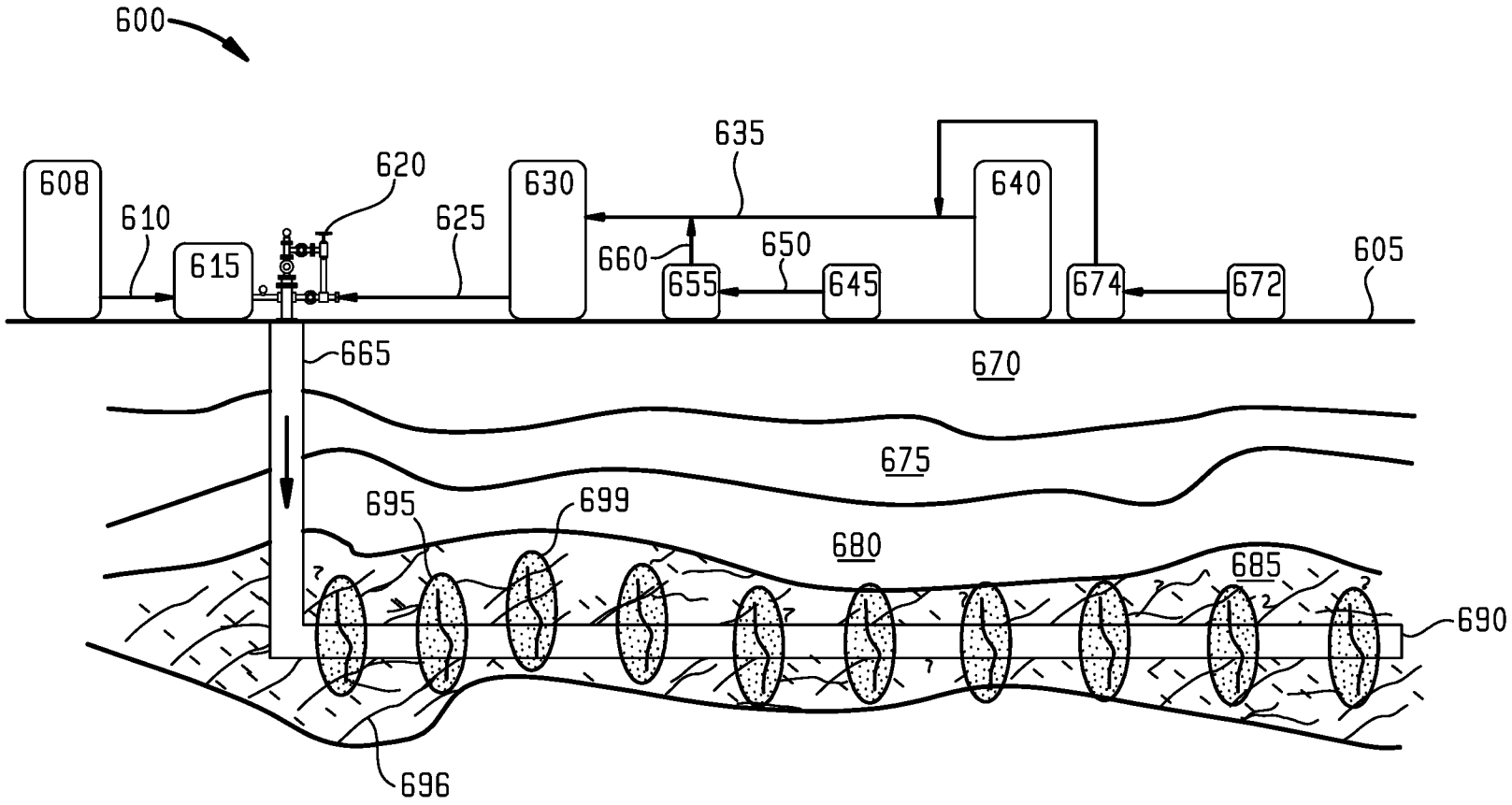
FIG. 6 is a schematic section view of a horizontal unconventional resource well.

FIG. 6 is a sectional view of a resource play 600 having an unconventional resource reservoir 685 that has both natural fractures 696 and hydraulically created fractures 695 (such as by a hydraulic fracturing stimulation) according to one embodiment. There are several formations below surface 605 including subsurface formation 670, subsurface formation 675, subsurface formation 680, and unconventional resource reservoir 685. Horizontal injection well 665 traverses subsurface formations 670, 675, 680, terminating in unconventional resource reservoir 685 with an extended horizontal lateral section 690. Injection facilities located on surface 605 are comprised of Y-Grade NGL storage tanks 640 connected to injection pump 630 via line 635 discharging to injection wellhead 620 via line 625.

A surfactant and/or a polymer from a chemical tank 645 is connected to dosing pump 655 via line 650 and to line 635 via discharge line 660. A secondary fluid tank 672 may also be coupled to line 635 via pump 674. Liquid nitrogen ($N_2$) is stored in liquid nitrogen storage tank and cryogenic pump skid 608. Liquid $N_2$ is pumped from skid 608 to vaporizer 615 via line 610. Gaseous $N_2$ is discharged from vaporizer 615 into injection wellhead 620 where it is mixed with pressurized Y-Grade NGL and surfactant and/or polymer to form pressurized Y-Grade NGL foam. Pressurized Y-Grade NGL foam is pumped down injection well 665 into extended horizontal lateral section 690, which has previously been completed with a multi-staged hydraulic fracturing stimulation as represented by hydraulic fractures 695. Pressurized Y-Grade NGL foam 699 is injected into unconventional resource reservoir 685 via hydraulic fractures 695 and natural fractures 696.

Figure 7:
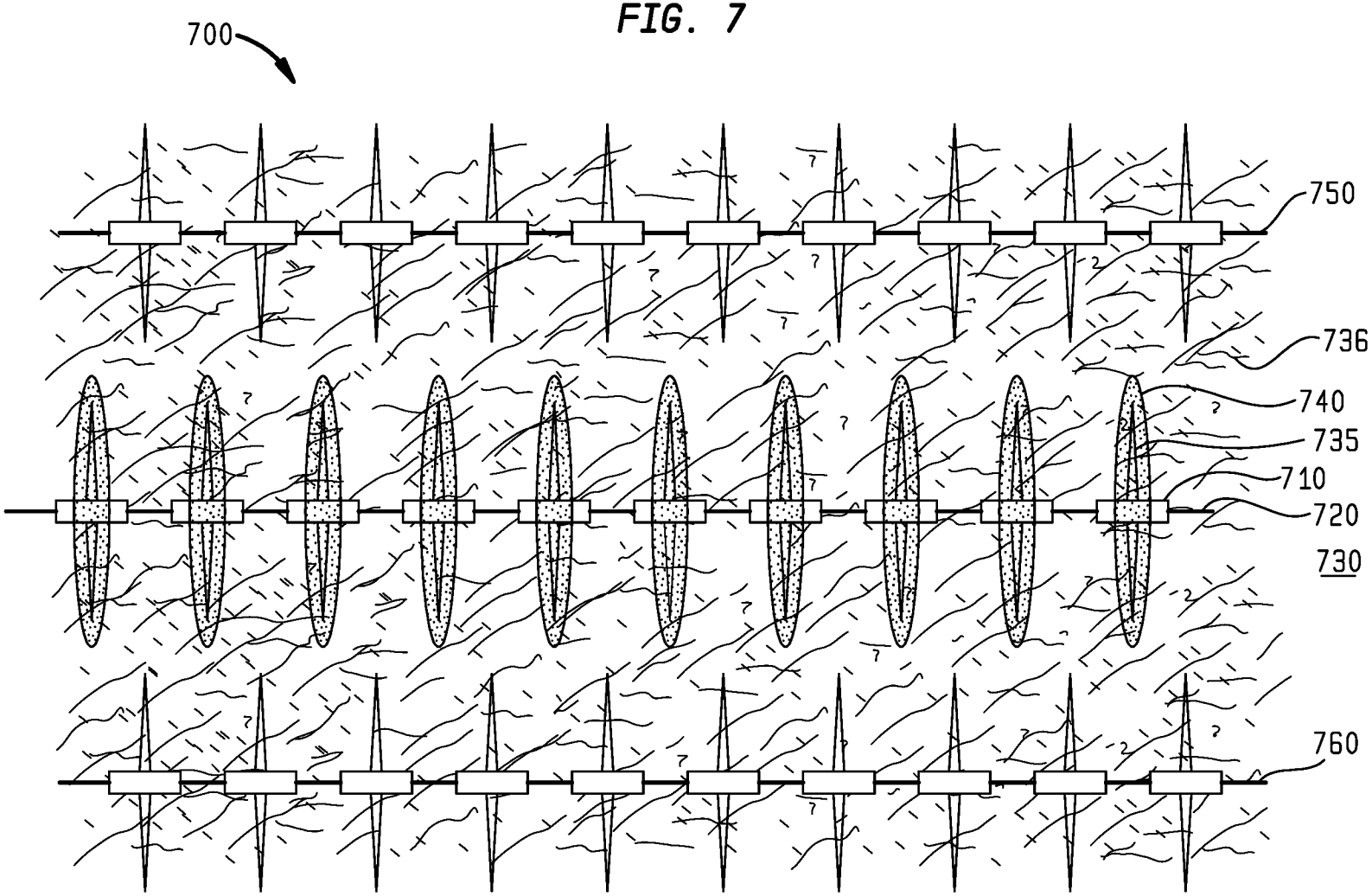
FIG. 7 is a schematic plan view of an array of horizontal unconventional resource wells

FIG. 7 is a plan view of a resource play 700 having an unconventional resource reservoir 730 that has both natural fractures 736 and hydraulically created fractures 735 (such as by a hydraulic fracturing stimulation) according to one embodiment. The unconventional resource reservoir 730 includes horizontal lateral production wellbores 750 and 760, and horizontal lateral injection wellbore 720 each completed with multi-stage hydraulic fracturing stimulations. An enhanced recovery fluid 740, such as one or a combination of Y-Grade NGL, Y-Grade NGL emulsion, Y-Grade NGL foam, Y-Grade NGL gel, nitrogen, carbon dioxide, ethane, water, viscosifed water, methane, and/or nanoparticles enters unconventional resource reservoir 730 via perforation cluster 710, hydraulic fractures 735, and natural fractures 736.

Figure 8:
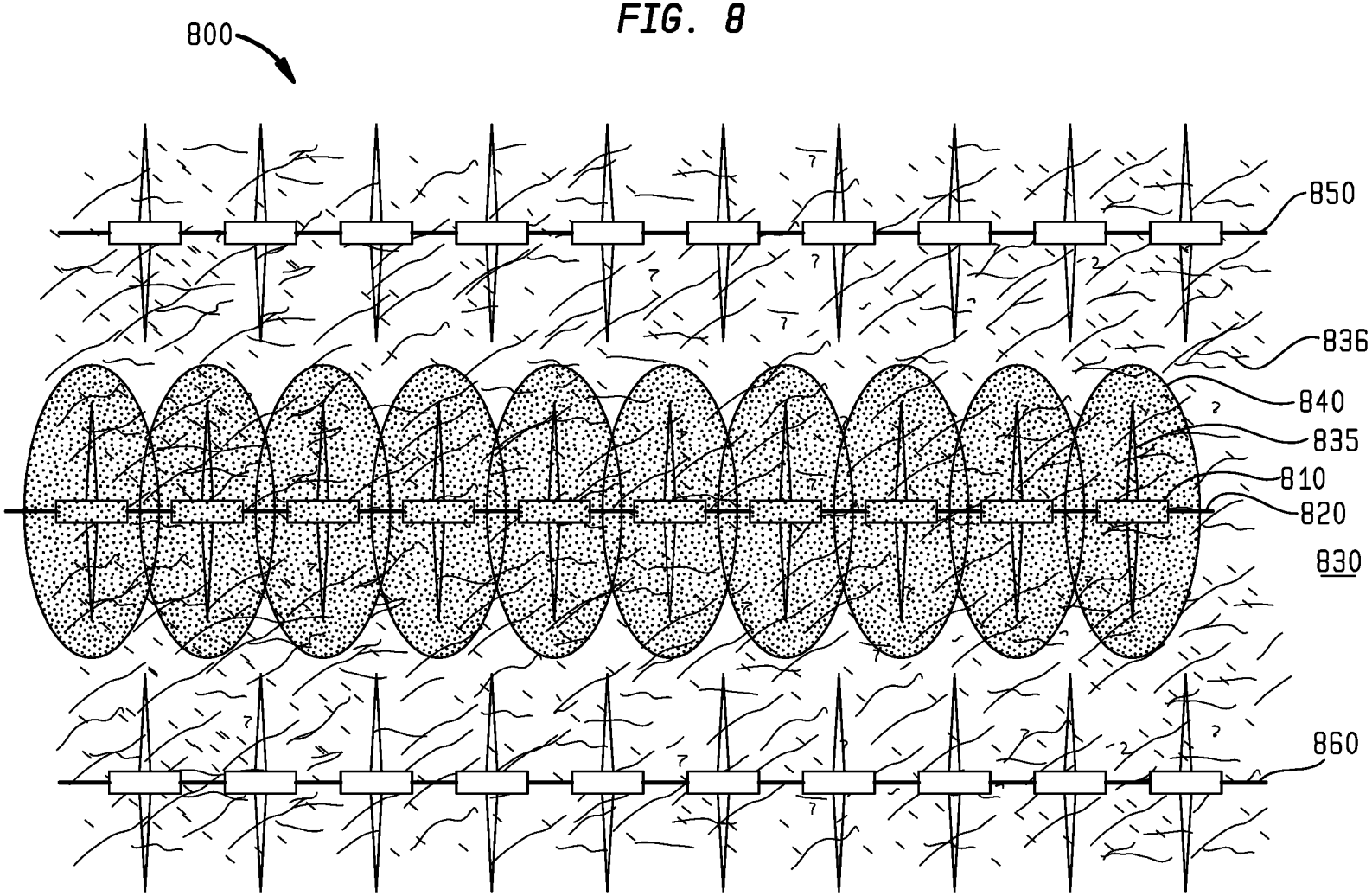
FIG. 8 is a schematic time-lapsed plan view of an array of horizontal resources wells.

FIG. 8 is an illustrated time-lapsed plan view of a resource play 800 having an unconventional resource reservoir 830 that has both natural fractures 836 and hydraulically created fractures 835 (such as by a hydraulic fracturing stimulation) according to one embodiment. The unconventional resource reservoir 830 includes horizontal lateral production wellbores 850 and 860, and horizontal lateral injection wellbore 820 each completed with multi-stage hydraulic fracturing stimulations. An enhanced recovery fluid 840, such as one or a combination of Y-Grade NGL, Y-Grade NGL emulsion, Y-Grade NGL foam, Y-Grade NGL gel, nitrogen, carbon dioxide, ethane, water, viscosifed water, methane, and/or nanoparticles enters unconventional resource reservoir 830 via perforation cluster 810, hydraulic fractures 835, and natural fractures 836 from horizontal injection well 820 where it disperses, mobilizes, and displaces oil, natural gas, water, Y-Grade NGL, nitrogen, carbon dioxide, ethane, water, viscosified water, methane, and/or nanoparticles towards offset horizontal lateral production wellbores 850 and 860. The fluids are produced back to the surface via horizontal lateral production wellbores 850 and 860.

Figure 9:
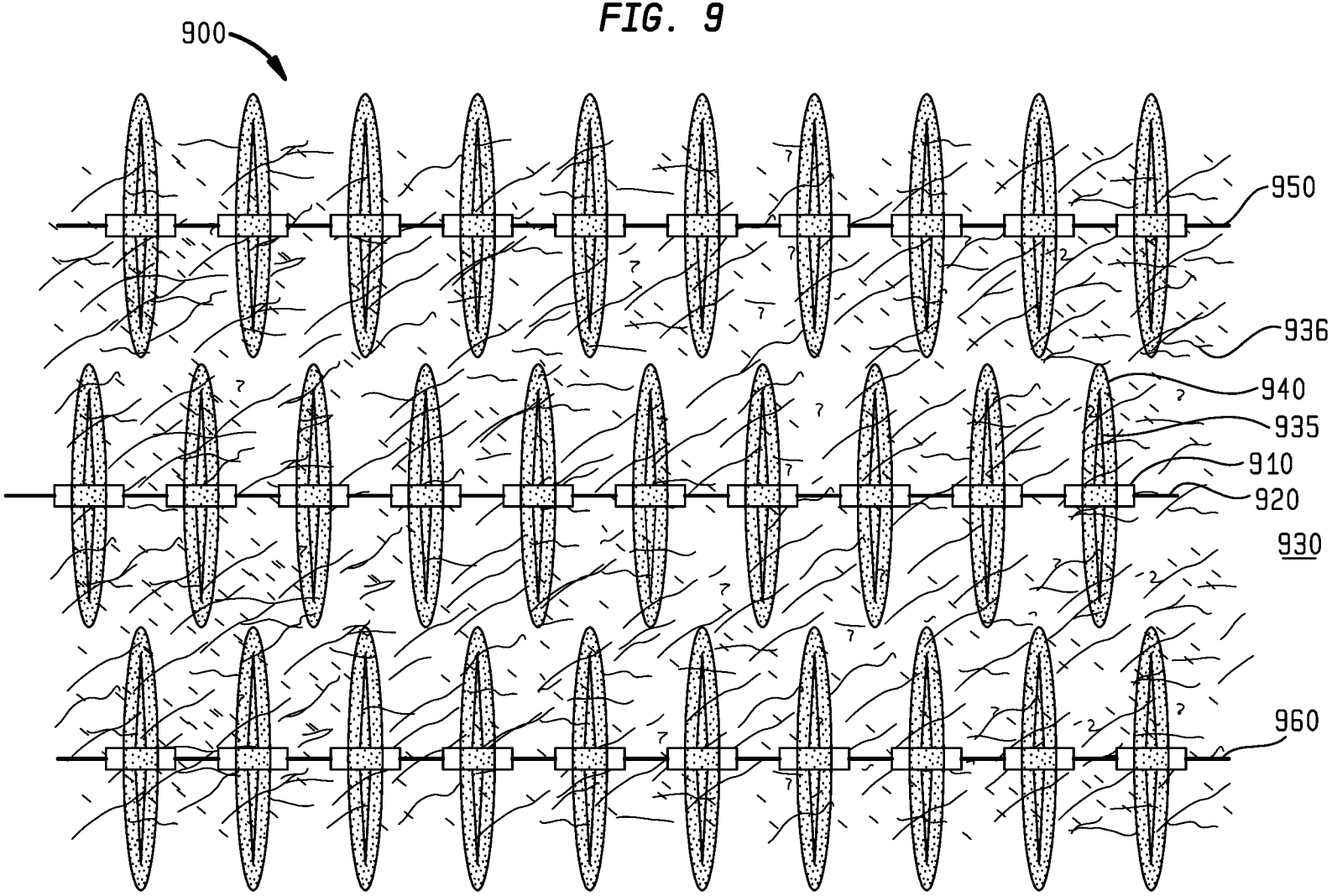
FIG. 9 is a schematic plan view of an array of horizontal unconventional resource wells

FIG. 9 is a plan view of a resource play 900 having an unconventional resource reservoir 930 that has both natural fractures 936 and hydraulically created fractures 935 (such as by a hydraulic fracturing stimulation) according to one embodiment. The unconventional resource reservoir 930 includes horizontal lateral wellbores 920, 950, and 960 each completed with multi-stage hydraulic fracturing stimulations. An enhanced recovery fluid 940, such as one or a combination of Y-Grade NGL, Y-Grade NGL emulsion, Y-Grade NGL foam, Y-Grade NGL gel, nitrogen, carbon dioxide, ethane, water, viscosifed water, methane, and/or nanoparticles enters unconventional resource reservoir 930 via perforation cluster 910, hydraulic fractures 935, and natural fractures 936 simultaneously in horizontal lateral production wellbores 920, 950, and 960.

Figure 10:
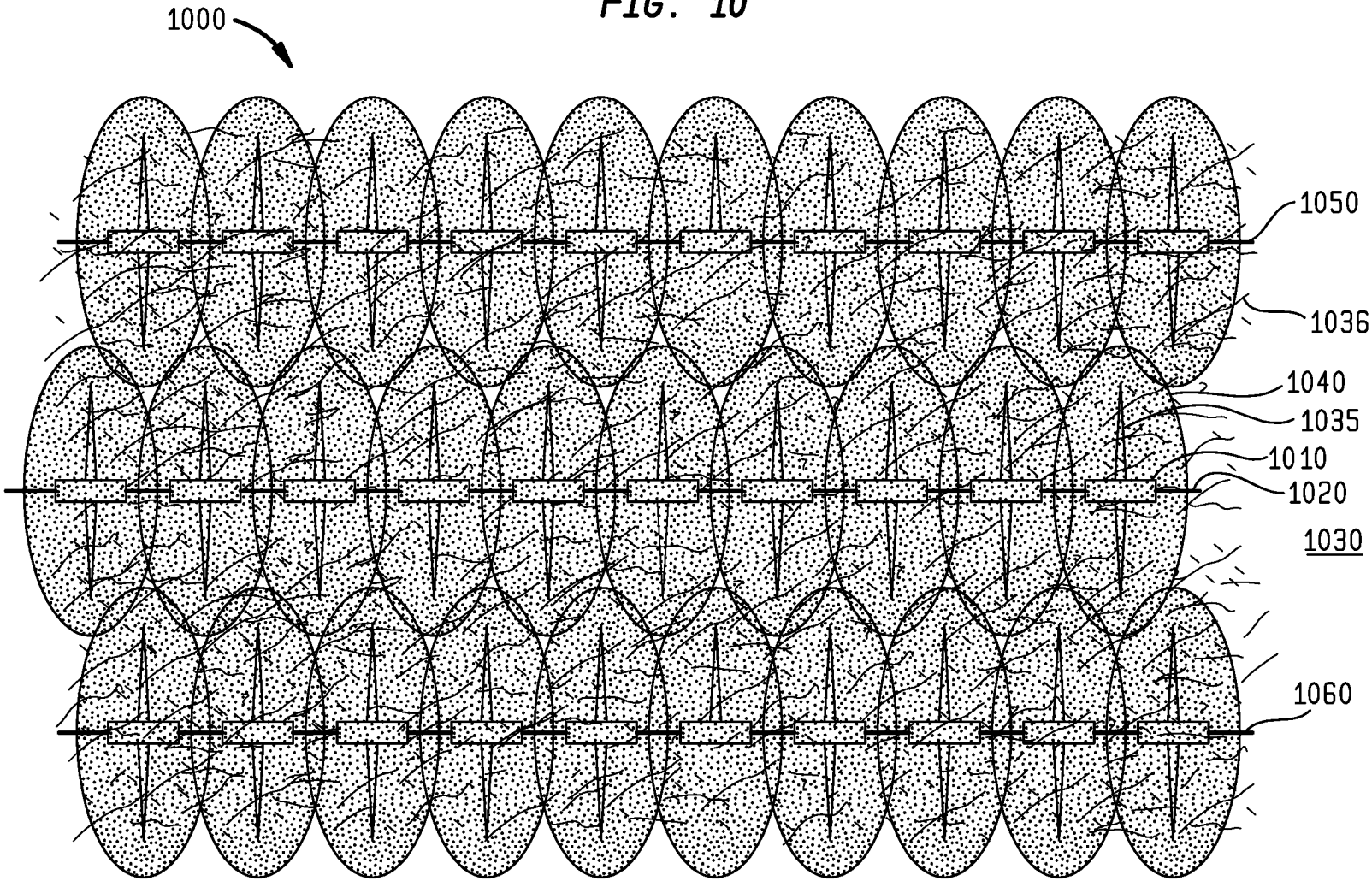
FIG. 10 is a schematic time-lapsed plan view of an array of horizontal resources wells.

FIG. 10 is an illustration of a time-lapsed plan view of a resource play 1000 having an unconventional resource reservoir 1030 that has both natural fractures 1036 and hydraulically created fractures 1035 (such as by a hydraulic fracturing stimulation) according to one embodiment. The unconventional resource reservoir 1030 includes horizontal lateral wellbores 1020, 1050, and 1060 each completed with multi-stage hydraulic fracturing stimulations. An enhanced recovery fluid 1040, such as one or a combination of Y-Grade NGL, Y-Grade NGL emulsion, Y-Grade NGL foam, Y-Grade NGL gel, nitrogen, carbon dioxide, ethane, water, viscosified water, nanoparticles, and/or methane is injected into unconventional resource reservoir 1030 via perforation cluster 1010, hydraulic fractures 1035, and natural fractures 1036 simultaneously in horizontal lateral wellbores 1020, 1050, and 1060. The enhanced recovery fluid 1040 expands, solubilizes and disperses within unconventional resource reservoir 1030. Following an extended soaking cycle, mobilized oil, natural gas, water, Y-Grade NGL, nitrogen, carbon dioxide, ethane, water, viscosifed water, nanoparticles, and/or methane are then produced back to the surface from unconventional resource reservoir 1030 via horizontal lateral wellbores 1020, 1050, and 1060.

Figure 11:
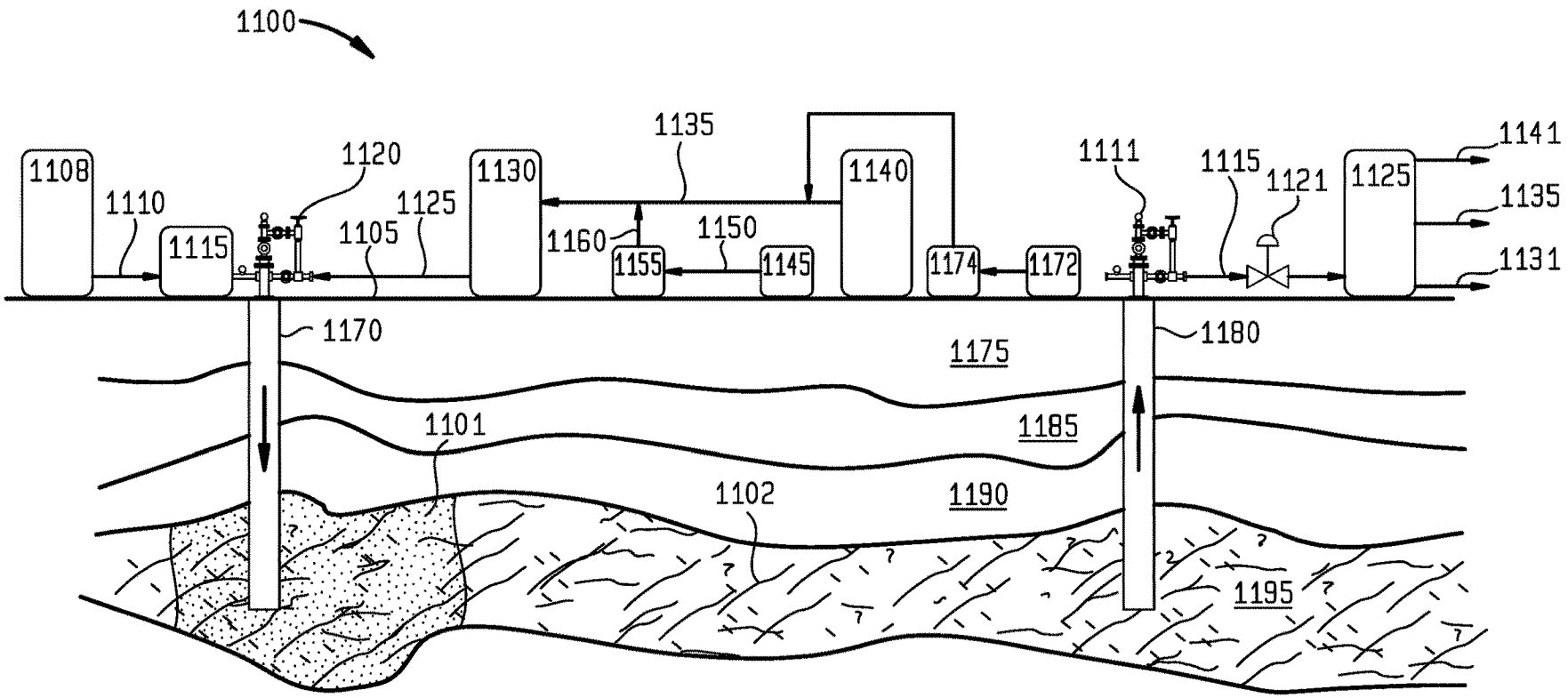
FIG. 11 is a schematic section view of a vertical unconventional resource well.

FIG. 11 is a sectional view of a resource play 1100 having an unconventional resource reservoir 1195 that has natural fractures 1102 according to one embodiment. There are several formations below surface 1105 including subsurface formation 1175, subsurface formation 1185, subsurface formation 1190, and unconventional resource reservoir 1095. Vertical injection well 1070 traverses subsurface formations 1175, 1185, 1190, terminating in unconventional resource reservoir 1195. Injection facilities located on surface 1105 are comprised of Y-Grade NGL storage tanks 1140 connected to injection pump 1130 via line 1135 discharging to injection wellhead 1120 via line 1125.

A surfactant and/or a polymer from a chemical tank 1145 may be provided to the injection wellhead 1120. The chemical tank 1145 is connected to dosing pump 1155 via line 1150 and to line 1135 via discharge line 1160. A secondary fluid tank 1172 may also be coupled to line 1135 via pump 1174. Liquid nitrogen ($N_2$) stored in liquid nitrogen storage tank and cryogenic pump skid 1108 is discharged into vaporizer 1115 via line 1110 and into injection wellhead 1120 where it is mixed with pressurized Y-Grade NGL and surfactant and/or polymer to form pressurized Y-Grade NGL foam. A pressurized Y-Grade NGL foam 1101 is continuously pumped down injection well 1170 into unconventional resource reservoir 1195 where it disperses, mobilizes, and displaces oil, natural gas, water, and Y-Grade NGL to production well 1180 where the fluids are produced to the surface 1105 to production wellhead 1111 and directed into three-phase separator 1125 via line 1115 and choke 1121. Separated oil, Y-Grade NGL, and condensate are transferred to existing surface storage tanks via line 1135, and water is transferred to existing surface storage tanks via line 1131. Separated gas is transferred to gas gathering system via line 1141.

Figure 12:
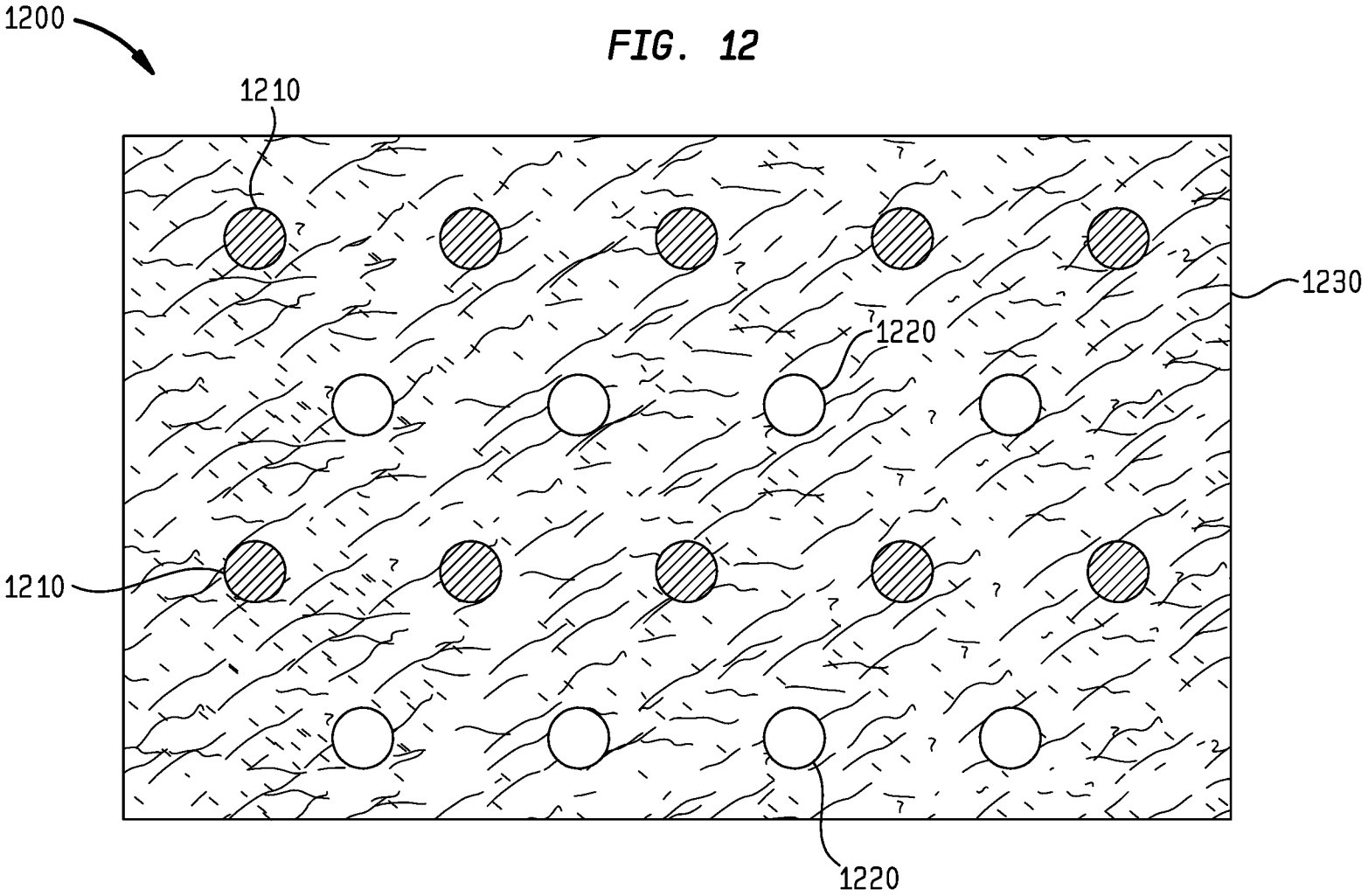
FIG. 12 is a schematic plan view of an array of unconventional resource wells.

FIG. 12 is a plan view of a resource play 1200 having an unconventional resource reservoir 1230 completed with an array of wells according to one embodiment. The array of wells includes well group 1210 denoted by circles with cross-hatched lines, and well group 1220 denoted by circles without cross-hatching. In one embodiment, an enhanced recovery fluid, such as one or a combination of Y-Grade NGL, Y-Grade NGL emulsion, Y-Grade NGL foam emulsion, Y-Grade NGL foam, Y-Grade NGL gel, nitrogen, carbon dioxide, ethane, water, viscosifed water, nanoparticles, and/or methane will be injected into well group 1210, and oil, natural gas, water, Y-Grade NGL, nitrogen, carbon dioxide, and/or methane will be recovered in well group 1220. In one embodiment, well group 1210 may be used for injection of the enhanced recovery fluid, and well group 1220 may be used for producing oil, natural gas, water, Y-Grade NGL, nitrogen, carbon dioxide, ethane, water, viscosifed water, nanoparticles, and/or methane from the unconventional resource reservoir 1230; and subsequently well group 1220 may be used for injection of the enhanced recovery fluid, and well group 1210 may be used for producing oil, natural gas, water, Y-Grade NGL, nitrogen, carbon dioxide, ethane, water, viscosifed water, nanoparticles, and/or methane from the unconventional resource reservoir 1230.

Figure 13:
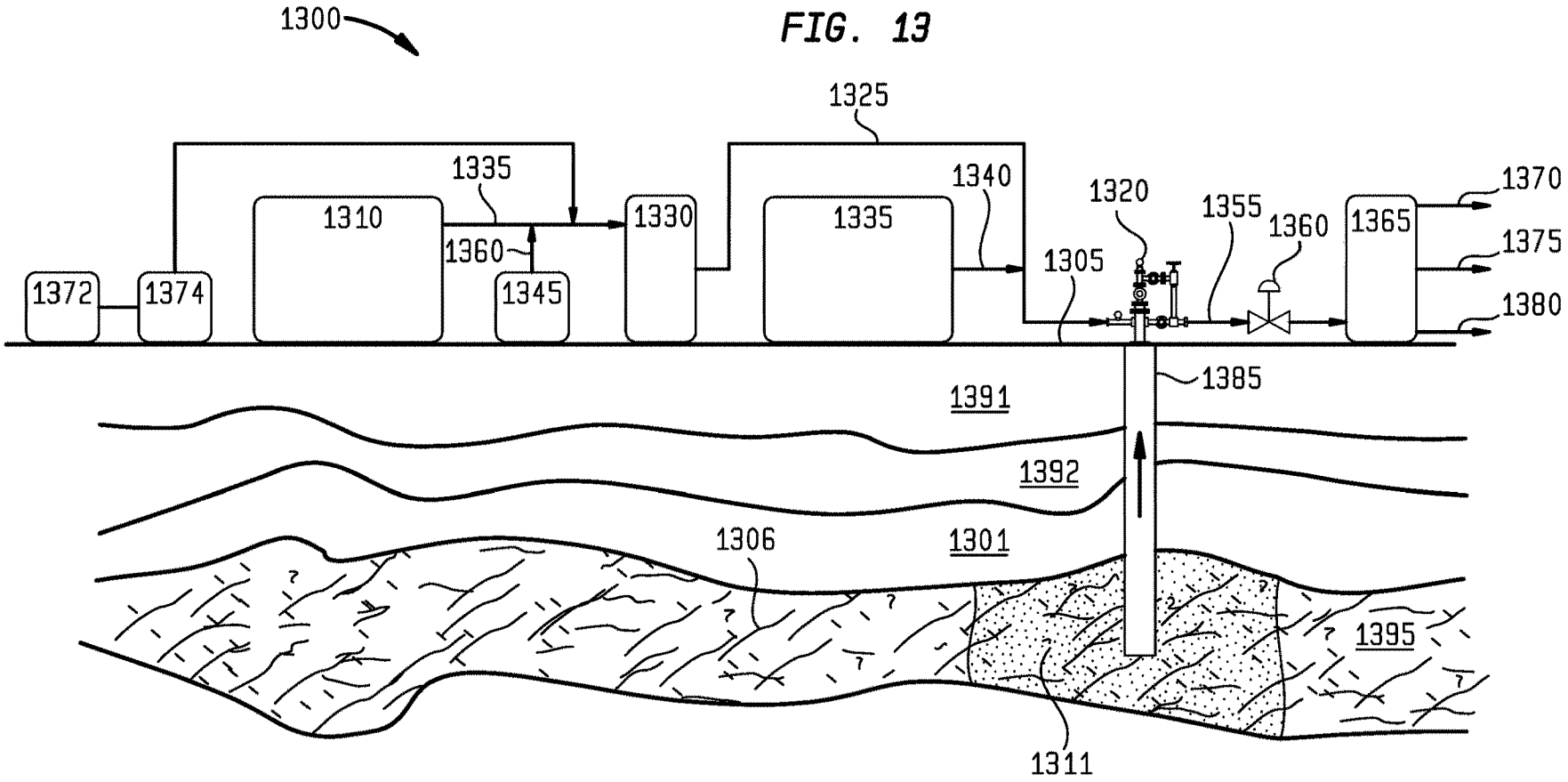
FIG. 13 is a schematic section view of a vertical unconventional resource well.

FIG. 13 is a sectional view of a resource play 1300 having an unconventional resource reservoir 1395 that has natural fractures 1306 according to one embodiment. There are several formations below above surface 1305 including subsurface formation 1390, subsurface formation 1395, subsurface formation 1301, and unconventional resource reservoir 1305. Vertical well 1385 traverses subsurface formations 1391, 1392, 1301, terminating in unconventional resource reservoir 1395. Facilities located on surface 1305, which may be mobile for easy relocation and/or set-up, are comprised of mobile Y-Grade NGL tanker(s) 1310 connected to injection pump 1330 via line 1335, which is connected to wellhead 1320 via line 1325.

A surfactant and/or polymer dosing pump and chemical storage tank 1345 is connected via line 1360 to injection pump 1330 via line 1335. A secondary fluid tank 1372 may also be coupled to line 1335 via pump 1374. Nitrogen ($N_2$) from tanker with vaporization or heat recovery unit 1335 is connected to wellhead 1320 via line 1340 where it is mixed with pressurized Y-Grade NGL from Y-Grade NGL tanker(s) 1310 and surfactant and/or polymer from chemical tank 1335 to generate pressurized Y-grade NGL foam. Pressurized Y-Grade NGL foam 1311 is pumped down vertical well 1385 into unconventional resource reservoir 1395 where it expands and disperses within unconventional resource reservoir 1395. Following an extended soaking cycle, mobilized oil, natural gas, water, and/or Y-Grade NGL are then produced back to the surface 1305 from unconventional resource reservoir 1395 via vertical well 1385 to wellhead 1320, and directed into a three-phase separator 1365 controlled by choke 1360 via line 1355. Gas separated in separator 1365 is sent to a gas gathering pipeline 1370, and separated liquid hydrocarbons and water are transported via lines 1375 and 1380 respectively, to liquid storage tanks.

Figure 14:
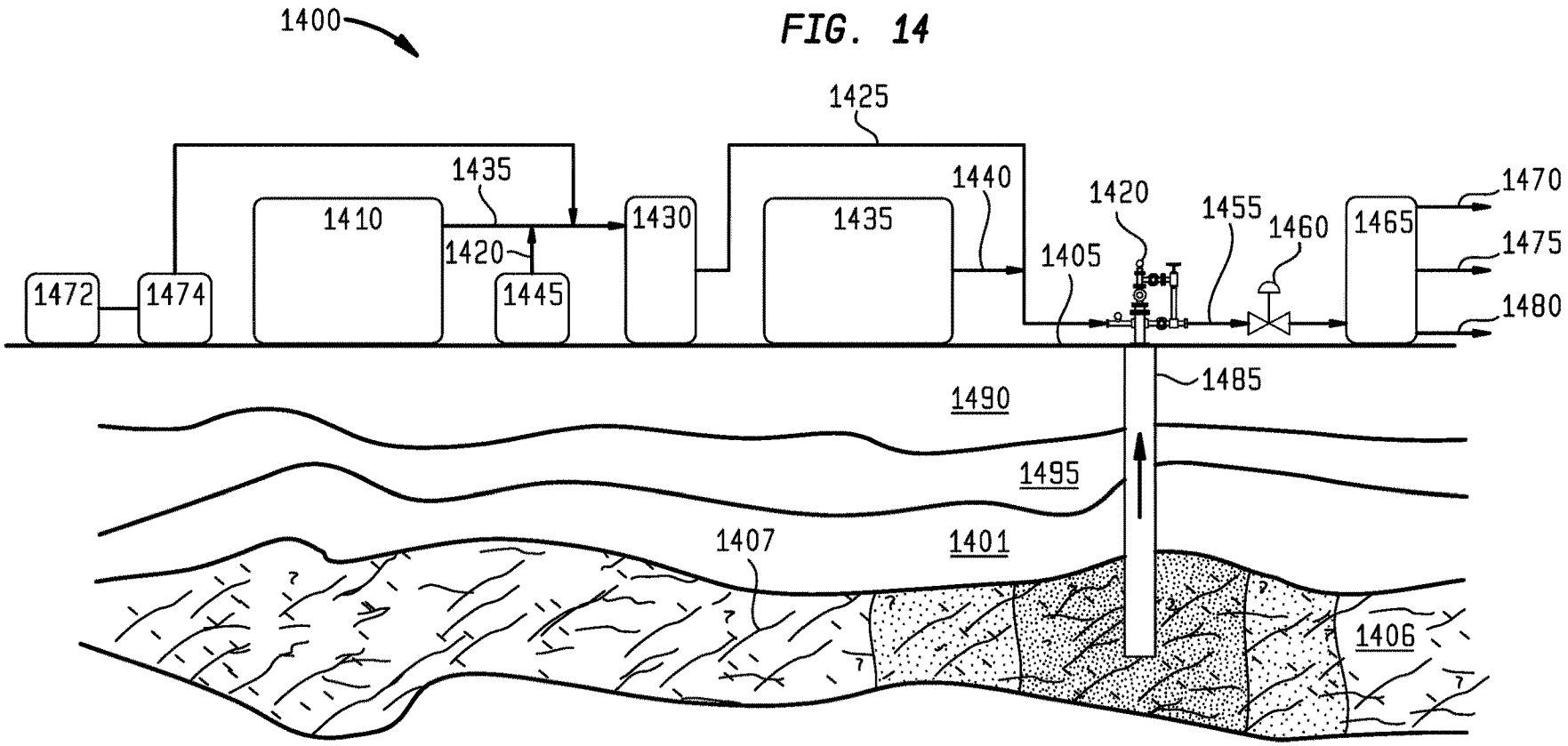
FIG. 14 is a schematic section view of a vertical unconventional resource well.

FIG. 14 is a sectional view of a resource play 1400 having an unconventional resource reservoir 1406 that has natural fractures 1407 according to one embodiment. There are several formations below surface 1405 including subsurface formation 1490, subsurface formation 1495, subsurface formation 1401, and unconventional resource reservoir 1406. Vertical well 1485 traverses subsurface formations 1490, 1495, 1401, terminating in unconventional resource reservoir 1406. Mobile facilities located on surface 1405 are comprised of mobile Y-Grade NGL tanker(s) 1410 connected to injection pump 1430 via line 1435, which is connected to wellhead 1420 via line 1425.

A surfactant and/or polymer dosing pump and chemical storage tank 1445 is connected via line 1420 to injection pump 1430 via line 1435. A secondary fluid tank 1472 may also be coupled to line 1435 via pump 1474. Nitrogen ($N_2$) from mobile tanker with vaporization or heat recovery unit 1435 is connected to wellhead 1420 via line 1440 where it is mixed with pressurized Y-Grade NGL from Y-Grade NGL tanker(s) 1410 and surfactant and/or polymer from chemical tank 1445 to generate pressurized Y-Grade NGL foam. A slug of pressurized Y-Grade NGL foam 1410 (which may contain nitrogen) is pumped down vertical well 1485 into unconventional resource reservoir 1406, and is followed by a continuous slug of gaseous nitrogen 1415 only to help disperse the Y-Grade NGL foam 1410 within the unconventional resource reservoir 1406. In one embodiment, one or more slugs of Y-Grade NGL foam 1410 may be alternately injected with one or more slugs of gaseous nitrogen 1415 into the unconventional resource reservoir 1406.

Following an extended soaking cycle, mobilized oil, natural gas, water, and/or Y-Grade NGL are displaced and produced back to the surface 1405 from resource reservoir 1406 via vertical well 1485 to wellhead 1450, and directed into a three-phase separator 1465 controlled by choke 1460 via line 1455. Gas separated in separator 1465 is sent to a gas gathering pipeline 1470, and separated liquid hydrocarbons and water are transported via lines 1475 and 1480 respectively to liquid storage tanks.

Figure 15:
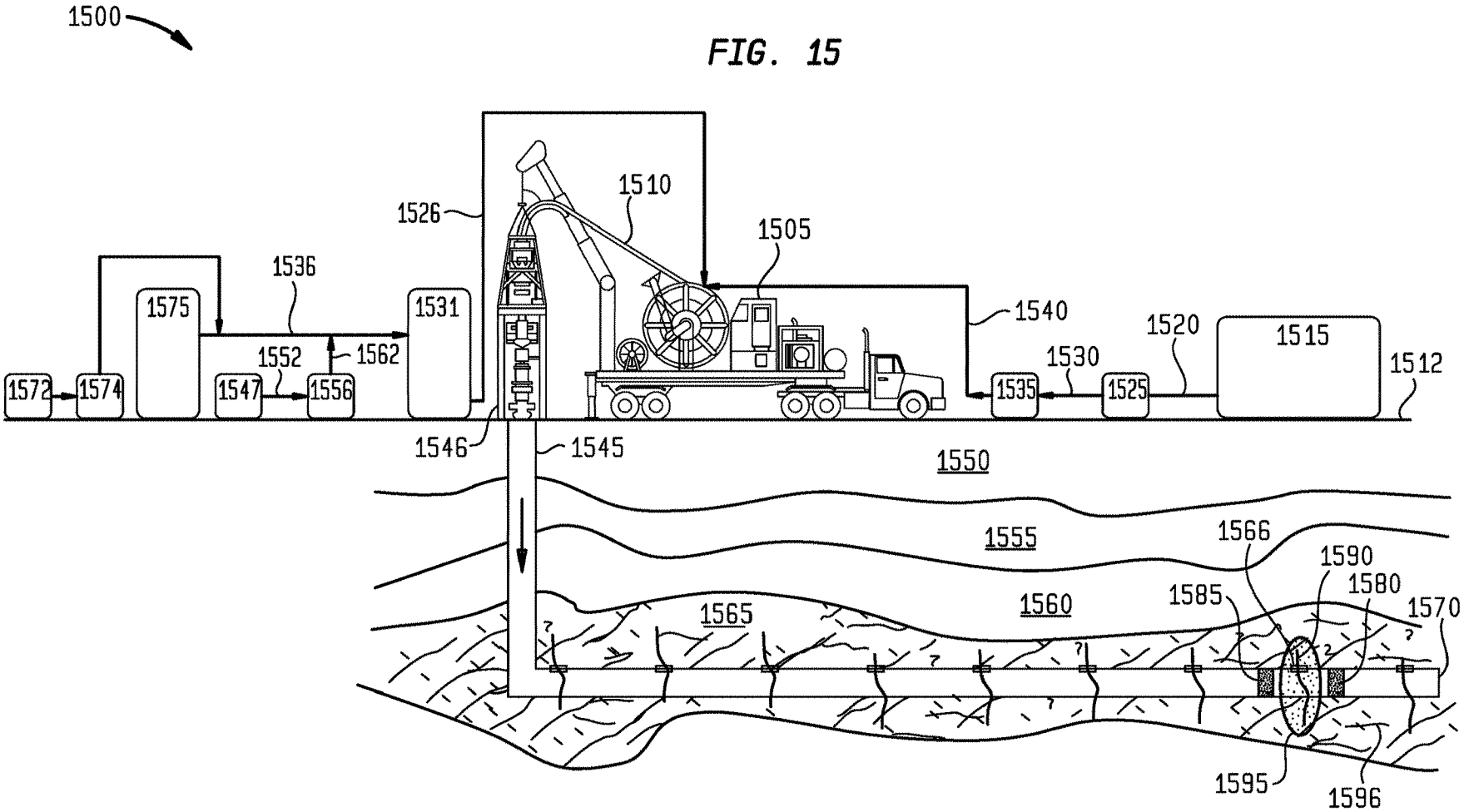
FIG. 15 is a schematic section view of a horizontal unconventional resource well.

FIG. 15 is a sectional view of a resource play 1500 having an unconventional resource reservoir 1565 that has both natural fractures 1596 and hydraulically created fractures 1590 (such as by a hydraulic fracturing stimulation) according to one embodiment. There are several formations below surface 1512 including subsurface formation 1550, subsurface formation 1555, subsurface formation 1560, and unconventional resource reservoir 1565. Well 1545 traverses subsurface formations 1550, 1555, 1560, terminating in unconventional resource reservoir 1565. Mobile coiled tubing unit 1505 located on surface 1512 provides an inner coiled tubing string 1510 that is run into well 1545 to the toe of lateral section 1570 of well 1545.

A packer assembly coupled to the inner coiled tubing string 1510, comprising retrievable bridge plug 1580 and packer 1585, is set to isolate a section of perforation cluster 1566 and hydraulic fractures 1590. Nitrogen ($N_2$) from liquid $N_2$ storage tank 1515 is transferred by cryogenic pump 1525 via line 1520 to vaporizer 1535 via lines 1530. Gaseous nitrogen 1595 is transferred from vaporizer 1535 to the isolated section of perforation cluster 1566 and hydraulic fractures 1590 through line 1540, the inner coiled tubing string 1510 and to the wellhead 1546. The gaseous nitrogen 1595 then flows into unconventional resource reservoir 1565 via the perforation cluster 1566, hydraulic fractures 1590, and natural fractures 1596. Y-Grade NGL from Y-Grade NGL storage tank 1575 discharges into pump 1531 via line 1536 and then flows into coiled tubing unit 1505 via line 1526. Chemical tank 1547 is connected to dosing pump 1556 via line 1552 and line 1536 via discharge line 1562. A secondary fluid tank 1572 may also be coupled to line 1536 via pump 1574.

In one embodiment, the unfractionated hydrocarbon mixture is configured to solubilize a portion of organic or inorganic material that is located within the unconventional resource reservoir. The organic material may comprise kerogen, wherein the kerogen is a type I, II, or III.

In one embodiment, a first array of vertical and/or horizontal wells comprises a mechanism to inject a continuous slug of an enhanced recovery fluid (comprising Y-Grade NGL for example) into an unconventional resource reservoir formation for a period of time to displace, re-pressurize, solubilize organic solids for example kerogens and sweep the reservoir, while a second array of vertical and/or horizontal wells comprises a mechanism to produce hydrocarbons from the reservoir during the total period of time when the enhanced recovery fluid is being injected.

In one embodiment, a first array of vertical and/or horizontal wells comprises a mechanism to inject a continuous slug of an enhanced recovery fluid comprising an emulsion of Y-Grade NGL, surfactant, and water into an unconventional resource reservoir for a period of time to displace, re-pressurize, solubilize organic solids for example kerogens, and sweep the reservoir, while a second array of vertical and/or horizontal wells comprises a mechanism to produce hydrocarbons from the reservoir during the total period of time when the emulsion of Y-Grade NGL, surfactant, and water is being injected.

In one embodiment, a first array of vertical and/or horizontal wells comprises a mechanism to inject alternating slugs of an enhanced recovery fluid (comprising Y-Grade NGL for example) and nitrogen into an unconventional resource reservoir to displace, re-pressurize, solubilize organic solids for example kerogens, and sweep the reservoir, while a second array of vertical and/or horizontal wells comprises a mechanism to produce hydrocarbons from the reservoir during the total period of time when the alternating slugs of the enhanced recovery fluid and nitrogen are being injected.

In one embodiment, a first array of vertical and/or wells comprises a mechanism to inject a continuous slug of an enhanced recovery fluid comprising a foam of Y-Grade NGL, surfactant, and nitrogen into an unconventional resource reservoir to displace and sweep the reservoir, while a second array of vertical and/or horizontal wells comprises a mechanism to produce hydrocarbons from the reservoir during the total period of time when the foam of Y-Grade NGL, surfactant, and nitrogen is being injected.

In one embodiment, a cycle known as "huff and puff" for producing hydrocarbons from an unconventional resource reservoir comprises a single vertical or horizontal well and a repeatable mechanism to inject a continuous slug of an enhanced recovery fluid (comprising Y-Grade NGL for example) into the reservoir for a period of time, followed by a period of time when the single vertical or horizontal well is shut-in to allow for soaking, dispersion, solubilization of organic solids for example kerogens, and imbibition of the enhanced recovery fluid within the reservoir, followed by a period of time returning the single vertical or horizontal well to production to produce hydrocarbons from the reservoir that have been mobilized by the injection of the enhanced recovery fluid, and then repeating the cycle.

In one embodiment, a cycle known as "huff and puff" for producing hydrocarbons from an unconventional resource reservoir comprises a single vertical or horizontal well and a repeatable mechanism to inject a continuous slug of an enhanced recovery fluid comprising an emulsion generated by mixing Y-Grade NGL, surfactant, and water, into the reservoir for a period of time, followed by a period of time when the single vertical or horizontal well is shut-in to allow for soaking, dispersion, solubilization of organic solids for example kerogens, and imbibition of the emulsion within the reservoir, followed by a period of time returning the single vertical or horizontal well to production to produce hydrocarbons from the reservoir that have been mobilized by the injection of the emulsion, and then repeating the cycle.

In one embodiment, a cycle known as "huff and puff" for producing hydrocarbons from an unconventional resource reservoir comprises a single vertical or horizontal well and a repeatable mechanism to inject alternating slugs of an enhanced recovery fluid (comprising Y-Grade NGL for example) and nitrogen into the reservoir for a period of time, followed by a period of time when the single vertical or horizontal well is shut-in to allow for soaking, dispersion, solubilization of organic solids for example kerogens, and imbibition of the alternating slugs of enhanced recovery fluid and nitrogen within the reservoir, followed by a period of time returning the single vertical or horizontal well to production to produce hydrocarbons from the reservoir that have been mobilized by the alternating injections of the slugs of enhanced recovery fluid and nitrogen, and then repeating the cycle.

In one embodiment, a cycle known as "huff and puff" for producing hydrocarbons from an unconventional resource reservoir comprises a single vertical or horizontal well and a repeatable mechanism to inject alternating slugs of an enhanced recovery fluid (comprising Y-Grade NGL for example) and water or viscosified water into the reservoir for a period of time, followed by a period of time when the single vertical or horizontal well is shut-in to allow for soaking, dispersion, solubilization of organic solids for example kerogens, and imbibition of the alternating slugs of enhanced recovery fluid and nitrogen within the reservoir, followed by a period of time returning the single vertical or horizontal well to production to produce hydrocarbons from the reservoir that have been mobilized by the alternating injections of the slugs of enhanced recovery fluid and nitrogen, and then repeating the cycle.

In one embodiment, a cycle known as "huff and puff" for producing hydrocarbons from an unconventional resource reservoir comprises a single vertical or horizontal well and a repeatable mechanism to inject a continuous slug of an enhanced recovery fluid comprising a foam generated by mixing Y-Grade NGL, surfactant, nitrogen, and water, into the reservoir for a period of time, followed by a period of time when the single vertical or horizontal well is shut-in to allow for soaking, dispersion, solubilization of organic solids for example kerogens, and imbibition of the foam within the reservoir, followed by a period of time returning the single vertical or horizontal well to production to produce hydrocarbons from the reservoir that have been mobilized by the injection of the foam, and then repeating the cycle.

In one embodiment, a method of enhanced oil recovery from an unconventional resource reservoir comprises injecting an enhanced recovery fluid comprising an unfractionated hydrocarbon mixture into the unconventional resource reservoir via an injection well, wherein the unfractionated hydrocarbon mixture a by-product that is condensed at a temperature at or below 0 degrees Fahrenheit of a demethanized hydrocarbon stream and comprises a mixture of ethane, propane, normal butane, isobutane, and pentane plus; and producing hydrocarbons from the unconventional resource reservoir via the injection well or a production well offset from the injection well. The injection well comprises an array of injection wells. The production well comprises an array of production wells.

The method further comprises mixing the unfractionated hydrocarbon mixture with a polymer to form the enhanced recovery fluid. The method further comprises mixing the unfractionated hydrocarbon mixture with a surfactant and water to create an emulsion forming the enhanced recovery fluid. The method further comprises mixing the unfractionated hydrocarbon mixture with a surfactant, water, and nitrogen to create a foam forming the enhanced recovery fluid.

The method further comprises mixing the unfractionated hydrocarbon mixture with nitrogen to form the enhanced recovery fluid. The method further comprises mixing the unfractionated hydrocarbon mixture with carbon dioxide to form the enhanced recovery fluid. The method further comprises mixing the unfractionated hydrocarbon mixture with methane to form the enhanced recovery fluid.

The method further comprises alternating injections of the enhanced recovery fluid and nitrogen into the unconventional resource reservoir via the injection well. The method further comprises alternating injections of the enhanced recovery fluid and carbon dioxide into the unconventional resource reservoir via the injection well. The method further comprises alternating injections of the enhanced recovery fluid and methane into the unconventional resource reservoir via the injection well.

The method further comprises injecting a slug of the enhanced recovery fluid followed by a continuous slug of nitrogen into the unconventional resource reservoir via the injection well. The method further comprises injecting a slug of the enhanced recovery fluid followed by a continuous slug of carbon dioxide into the unconventional resource reservoir via the injection well. The method further comprises injecting a slug of the enhanced recovery fluid followed by a continuous slug of methane, ethane, and natural gas, or a combination thereof into the unconventional resource reservoir via the injection well.

The method further comprises simultaneously injecting the enhanced recovery fluid into one or more offset injection wells, shutting in the injection wells for a period of time to allow the enhanced recovery injection fluid to soak in the unconventional resource reservoir, and then producing the hydrocarbons from the unconventional resource reservoir via the injection wells.

The method further comprises mixing the unfractionated hydrocarbon mixture with a surfactant and water to create an emulsion forming the enhanced recovery fluid, shutting in the injection well for a period of time to allow the enhanced recovery fluid to soak in the unconventional resource reservoir, and producing the hydrocarbons from the unconventional resource reservoir via the injection well.

The method further comprises mixing the unfractionated hydrocarbon mixture with a surfactant, water, and nitrogen to create a foam forming the enhanced recovery fluid, shutting in the injection well for a period of time to allow the enhanced recovery fluid to soak in the unconventional resource reservoir, then producing the hydrocarbons from the unconventional resource reservoir via the injection well.

The composition of the unfractionated hydrocarbon mixture comprises ethane, propane, and butane in an amount of at least 75% by volume of the unfractionated hydrocarbon mixture. The composition of the unfractionated hydrocarbon mixture comprises ethane in an amount of at least 3% by volume of the unfractionated hydrocarbon mixture. The composition of the unfractionated hydrocarbon mixture comprises pentane plus in an amount less than 30% by volume of the unfractionated hydrocarbon mixture.

The method further comprises injecting the enhanced recovery fluid into the unconventional resource reservoir at an injection pressure less than or equal to 10,000 pounds per square inch.

The method further comprises mixing the unfractionated hydrocarbon mixture with a nonionic surfactant, and up to ten percent fresh water inhibited with up to 4 percent of potassium chloride, and nitrogen to create a foam forming the enhanced recovery fluid.

The method further comprises producing hydrocarbons from the unconventional resource reservoir via a pair of production wells that are offset from and located on opposite sides of the injection well.

The method further comprises running an inner string into the injection well, isolating one or more sections of hydraulic fractures of the unconventional resource reservoir, and injecting the enhanced recovery fluid through the inner string and into each isolated section within the unconventional resource reservoir.

The method further comprises injecting a chemical diverting agent into the unconventional resource reservoir to temporarily block high volume perforation clusters formed in the injection well so that the enhanced recovery fluid is injected uniformly into the unconventional resource reservoir.

The method further comprises continuously injecting the enhanced recovery fluid into the unconventional resource reservoir via the injection well while producing the hydrocarbons from the production well.

In one embodiment, a method of enhanced oil recovery from an unconventional resource reservoir comprises injecting a gas comprising at least one of nitrogen, carbon dioxide, ethane, and methane into the unconventional resource reservoir via an injection well; and producing hydrocarbons from the unconventional resource reservoir via the injection well or a production well offset from the injection well. The injection well comprises an array of injection wells. The production well comprises an array of production wells.

The method further comprises shutting in the injection well for a period of time to allow the gas to soak in the unconventional resource reservoir, and then producing the hydrocarbons from the unconventional resource reservoir via the injection well.

The method further comprises injecting the gas into the unconventional resource reservoir at an injection pressure less than or equal to 10,000 pounds per square inch.

The method further comprises producing hydrocarbons from the unconventional resource reservoir via a pair of production wells that are offset from and located on opposite sides of the injection well.

The method further comprises running an inner string into the injection well, isolating one or more sections of hydraulic fractures of the unconventional resource reservoir, and injecting the gas through the inner string and into each isolated section and the unconventional resource reservoir. The inner string consisting of gas lift mandrels and gas lift valves, and further comprising injecting the gas through the gas lift mandrels and gas lift valves at each isolated section to regulate a volume of the gas that is injected into the unconventional resource reservoir at each isolated section.

The method further comprises injecting a chemical diverting agent into the unconventional resource reservoir to temporarily block high volume perforation clusters formed in the injection well so that the gas is injected uniformly into the unconventional resource reservoir.

The method further comprises continuously injecting the gas into the unconventional resource reservoir via the injection well while producing hydrocarbons from the production well.

In one embodiment, a method of enhanced oil recovery from an unconventional resource reservoir comprises running an inner string into an injection well; setting a packer assembly to isolate a section of perforation clusters and hydraulic fractures formed in the unconventional resource reservoir; injecting an enhanced recovery fluid through the inner string and into the isolated section in the unconventional resource reservoir; and producing hydrocarbons from the unconventional resource reservoir via the injection well or a production well offset from the injection well. The injection well comprises an array of injection wells. The production well comprises an array of production wells.

The enhanced recovery fluid comprises an unfractionated hydrocarbon mixture into the unconventional resource reservoir via an injection well, wherein the unfractionated hydrocarbon mixture is a by-product that is condensed at a temperature at or below 0 degrees Fahrenheit of a demethanized hydrocarbon stream and comprises a mixture of ethane, propane, normal butane, isobutane, and pentane plus.

The method further comprises using the unfractionated hydrocarbon mixture to form the enhanced recovery fluid. The method further comprises mixing the unfractionated hydrocarbon mixture with a polymer to form the enhanced recovery fluid. The method further comprises mixing the unfractionated hydrocarbon mixture with a surfactant and water to create an emulsion forming the enhanced recovery fluid. The method further comprises mixing the unfractionated hydrocarbon mixture with a surfactant, water, and nitrogen to create a foam forming the enhanced recovery fluid.

The method further comprises mixing the unfractionated hydrocarbon mixture with nitrogen to form the enhanced recovery fluid. The method further comprises mixing the unfractionated hydrocarbon mixture with carbon dioxide to form the enhanced recovery fluid. The method further comprises mixing the unfractionated hydrocarbon mixture with methane to form the enhanced recovery fluid.

The composition of the unfractionated hydrocarbon mixture comprises ethane, propane, and butane in an amount of at least 75% by total volume of the unfractionated hydrocarbon mixture. The composition of the unfractionated hydrocarbon mixture comprises ethane in an amount of at least 3% by volume of the unfractionated hydrocarbon mixture. The composition of the unfractionated hydrocarbon mixture comprises pentane plus in an amount less than 25% by total volume of the unfractionated hydrocarbon mixture.

The method further comprises alternating injections of the enhanced recovery fluid and nitrogen through the inner string and into the isolated section in the unconventional resource reservoir. The method further comprises alternating injections of the enhanced recovery fluid and carbon dioxide through the inner string and into the isolated section in the unconventional resource reservoir. The method further comprises alternating injections of the enhanced recovery fluid and methane through the inner string and into the isolated section of the unconventional resource reservoir. The method further comprises alternating injections of the enhanced recovery fluid and water or viscosified water through the inner string and into the isolated section in the unconventional resource reservoir.

The method further comprises injecting a slug of the enhanced recovery fluid followed by a continuous slug of nitrogen through the inner string and into the isolated section in the unconventional resource reservoir. The method further comprises injecting a slug of the enhanced recovery fluid followed by a continuous slug of carbon dioxide through the inner string and into the isolated section in the unconventional resource reservoir. The method further comprises injecting a slug of the enhanced recovery fluid followed by a continuous slug of methane through the inner string and into the isolated section in the unconventional resource reservoir. The method further comprises continuous slug of the enhanced recovery fluid followed by a continuous slug of water or viscosified water through the inner string and into the isolated section in the unconventional resource reservoir.

The method further comprises simultaneously injecting the enhanced recovery fluid into one or more offset injection wells, shutting in the injection wells for a period of time to allow the enhanced recovery injection fluid to soak in the unconventional resource reservoir, and then producing the hydrocarbons from the unconventional resource reservoir via the injection wells.

The method further comprises mixing an unfractionated hydrocarbon mixture with a surfactant and water to create an emulsion forming the enhanced recovery fluid, shutting in the injection well for a period of time to allow the enhanced recovery fluid to soak in the unconventional resource reservoir, and the producing the hydrocarbons from the unconventional resource reservoir via the injection well.

The method further comprises mixing an unfractionated hydrocarbon mixture with a surfactant, water, and nitrogen to create a foam forming the enhanced recovery fluid, shutting in the injection well for a period of time to allow the enhanced recovery fluid to soak in the unconventional resource reservoir, then producing the hydrocarbons from the unconventional resource reservoir via the injection well.

The method further comprises injecting the enhanced recovery fluid through the inner string and into the isolated section and the unconventional resource reservoir at an injection pressure less than or equal to 10,000 pounds per square inch.

The method further comprises mixing an unfractionated hydrocarbon mixture with a nonionic surfactant, and up to ten percent fresh water inhibited with up to 4 percent potassium chloride, and nitrogen to create a foam forming the enhanced recovery fluid.

The method further comprises producing hydrocarbons from the unconventional resource reservoir via a pair of production wells that are offset from and located on opposite sides of the injection well.

The method further comprises isolating one or more sections of perforation clusters and hydraulic fractures, and injecting the enhanced recovery fluid through the inner string and into the isolated sections of the unconventional resource reservoir at each isolated section. The inner string comprises a gas lift mandrel and a gas lift valve positioned between each packer assembly that are configured to regulate the volume of the enhanced recovery fluid that is injected into the unconventional resource reservoir at each isolated section.

The method further comprises continuously injecting the enhanced recovery fluid through the inner string and into the isolated section and the unconventional resource reservoir while producing the hydrocarbons from the production well.

The inner string is a coiled tubing string, and wherein the packer assembly comprises a retrievable bridge plug and packer.

The enhanced recovery fluid is a gas comprising at least one of nitrogen, carbon dioxide, ethane, and methane.

In one embodiment, a method for enhanced or improved oil recovery, comprises injecting an enhanced recovery fluid through an injection well into an unconventional resource reservoir to mobilize hydrocarbons, wherein the enhanced recovery fluid comprises an unfractionated hydrocarbon mixture that is a byproduct of a condensed and de-methanized hydrocarbon stream that is soluble with hydrocarbons in the unconventional resource reservoir, wherein the unfractionated hydrocarbon mixture comprises ethane, propane, and butane in an amount of at least 75% by total volume, and wherein the unfractionated hydrocarbon mixture comprises pentane plus in an amount less than 25% by total volume. The method further comprises producing hydrocarbons from the unconventional resource reservoir via the injection well or a production well offset from the injection well.

In some embodiments, the unfractionated hydrocarbon mixture is condensed out of the hydrocarbon stream at a temperature at or below 0 degrees Fahrenheit.

In some embodiments, the unfractionated hydrocarbon mixture comprises ethane in an amount of at least 3% by total volume.

In some embodiments, the injection well comprises an array of vertical or horizontal injection wells, and wherein the production well comprises an array of vertical or horizontal production wells offset from the array of injection wells.

The method further comprises alternating slugs of the enhanced recovery fluid into the unconventional resource reservoir.

The method further comprises alternating slugs of the enhanced recovery fluid into the unconventional resource reservoir.

In some embodiments, the enhanced recovery fluid comprises at least one of carbon dioxide, nitrogen, natural gas, liquefied natural gas (LNG), methane, ethane, water, and viscosified water.

In some embodiments, the injection pressure of the enhanced recovery fluid is between 0 psi to 10,000 psi.

In some embodiments, the unconventional resource reservoir is carbonate or clastic.

The method further comprises adding a secondary fluid to the enhanced recovery fluid. In some embodiments, secondary fluid comprises at least one of aromatics, alkanes, and crude oil, and wherein the secondary fluid comprises 10% or less by volume of the enhanced recovery fluid.

In some embodiments, the aromatics comprise at least one of benzene, naphtha, xylene, toluene, fuel oils, olefins, and diesel. In some embodiments, the alkanes comprise at least one of heptane, octane, and hexane. In some embodiments, the crude oil comprises at least one of residual oil in the unconventional resource reservoir, medium oil, light oil, and condensate.

The method further comprises adding nanoparticles to the enhanced recovery fluid.

The method further comprises mixing the unfractionated hydrocarbon mixture with a surfactant and a gas to form a hydrocarbon foam as the enhanced recovery fluid.

In some embodiments, the surfactant is a nonionic surfactant. The nonionic surfactant comprises at least one of a siloxane surfactant, a fluorosurfactant, a fatty acid ester, a glyceride, a silicon emulsifier, and a hydrophobic silica powder. In some embodiments, the surfactant comprises a mass concentration of up to 5%.

The method further comprises adding a foam stabilizer to the hydrocarbon foam, wherein the foam stabilizer is a hydrocarbon soluble copolymer.

The method further comprises adding a secondary fluid to the hydrocarbon foam. In some embodiments, the secondary fluid comprises at least one of aromatics, alkanes, and crude oil, and wherein the secondary fluid comprises 10% or less by volume of the hydrocarbon foam. In some embodiments, the aromatics comprise at least one of benzene, naphtha, xylene, toluene, fuel oils, olefins, and diesel. In some embodiments, the alkanes comprise at least one of heptane, octane, and hexane. In some embodiments, the crude oil comprises at least one of residual oil in the unconventional resource reservoir, medium oil, light oil, and condensate.

The method further comprises adding nanoparticles to the hydrocarbon foam.

In some embodiments, the method further comprises adding nitrogen to the unfractionated hydrocarbon mixture, wherein the nitrogen is liquid nitrogen sourced from an air separation device configured to separate nitrogen from air and supply the nitrogen to a nitrogen source. In some embodiments, the air separation device is an ECOGAN™ modular air separation plant (developed by Linde AG Engineering) with a liquification unit to create liquid nitrogen or other similar air separation unit.

The method further comprises mixing the unfractionated hydrocarbon mixture with an emulsifying agent and water to form an emulsion as the enhanced recovery fluid.

The method further comprises simultaneously injecting the unfractionated hydrocarbon mixture, the emulsifying agent, and the water into the unconventional resource reservoir. In some embodiments, the water is formation water, brine or seawater and comprises up to 25% of the liquid phase of the emulsion. In some embodiments, the water is potassium chloride water and comprises up to 25% of the liquid phase of the emulsion, wherein the potassium chloride water comprises up to 4% potassium chloride. In some embodiments, the emulsifying agent is a surfactant, and wherein the surfactant is a nonionic surfactant, an anionic surfactant, and a cationic surfactant. In some embodiments, the nonionic surfactant comprises at least one of a siloxane surfactant, a fluorosurfactant, a fatty acid ester, a glyceride, a silicon emulsifier, and a hydrophobic silica powder. In some embodiments, the anionic surfactant comprises at least one of 2-Acrylamido-2-methylpropane sulfonic acid, ammonium lauryl sulfate, ammonium perfluorononanoate, docusate, magnesium laureth sulfate, MBAS assay, perfluorobutanesulfonic acid, perfluorononanoic acid, perfluorooctanesulfonic acid, perfluorooctanoic acid, phospholipid, potassium lauryl sulfate, soap, soap substitute, sodium alkyl sulfate, sodium dodecyl sulfate, sodium dodecylbenzenesulfonate, sodium laurate, sodium laureth sulfate, sodium lauroyl sarcosinate, sodium myreth sulfate, sodium nonanoyloxybenzenesulfonate, sodium pareth sulfate, sodium stearate, and sulfolipid. In some embodiments, the cationic surfactant comprises at least one of behentrimonium chloride, benzalkonium chloride, benzethonium chloride, bronidox, cetrimonium bromide, cetrimonium chloride, dimethyldioctadecylammonium bromide, dimethyldioctadecylammonium chloride, lauryl methyl gluceth-10 hydroxypropyl dimonium chloride, octenidine dihydrochloride, olaflur, N-Oleyl-1,3-propanediamine, stearalkonium chloride, tetramethylammonium hydroxide, and thonzonium bromide. In some embodiments, the surfactant comprises a mass concentration of up to 5%.

The method further comprises adding a secondary fluid to the emulsion. In some embodiments, the secondary fluid comprises at least one of aromatics, alkanes, and crude oil, and wherein the secondary fluid comprises 10% or less by volume of the emulsion. In some embodiments, the aromatics comprise at least one of benzene, naphtha, xylene, toluene, fuel oils, olefins, and diesel. In some embodiments, the alkanes comprise at least one of heptane, octane, and hexane. In some embodiments, the crude oil comprises at least one of residual oil in the unconventional resource reservoir, medium oil, light oil, and condensate.

The method further comprises adding nanoparticles to the emulsion.

In some embodiments, the method further comprises adding nitrogen to the emulsion, wherein the nitrogen is liquid nitrogen sourced from an air separation device configured to separate nitrogen from air and supply the nitrogen to a nitrogen source. In some embodiments, the air separation device is an ECOGAN™ modular air separation plant with a liquification unit to create liquid nitrogen or other similar air separation unit.

The method further comprises adding a viscosifier to the emulsion, wherein the viscosifier comprises at least one of a hydrocarbon soluble co-polymer and a water soluble viscosifier, and wherein the water soluble viscosifer comprises at least one of water soluble co-polymers, polysaccarides, guar gum, viscoelastic surfactants, crosslinkers, cellulosic viscosifiers, and hydroxyethyl cellulose.

In another embodiment, a method for enhanced or improved oil recovery. The method comprises mixing an unfractionated hydrocarbon mixture with a gelling agent to form a gelled enhanced recovery fluid, wherein the unfractionated hydrocarbon mixture is a byproduct of a condensed and de-methanized hydrocarbon stream that is miscible with hydrocarbons, wherein the unfractionated hydrocarbon mixture comprises ethane, propane, and butane in an amount of at least 75% by total volume, and wherein the unfractionated hydrocarbon mixture comprises pentane plus in an amount less than 25% by total volume. The method further comprises injecting the gelled enhanced recovery fluid through an injection well into an unconventional resource reservoir, and producing hydrocarbons from the unconventional resource reservoir via the injection well or a production well offset from the injection well.

In some embodiments, the unfractionated hydrocarbon mixture is condensed out of the hydrocarbon stream at a temperature at or below 0 degrees Fahrenheit.

In some embodiments, the unfractionated hydrocarbon mixture comprises ethane in an amount of at least 3% by total volume.

In some embodiments, the injection well comprises an array of vertical or horizontal injection wells, and wherein the production well comprises an array of vertical or horizontal production wells offset from the array of vertical injection wells.

In some embodiments, the injection well comprises a single vertical or horizontal well.

The method further comprises injecting a gas into the unconventional resource reservoir at the conclusion of the injection of the gelled enhanced recovery fluid. In some embodiments, the gas comprises at least one of natural gas, methane, ethane, LNG, nitrogen, and carbon dioxide.

In some embodiments, the injection pressure of the gelled enhanced recovery fluid is between 0 psi to 10,000 psi.

In some embodiments, the gelling agent comprises at least one of a hydrocarbon soluble copolymers, phosphate esters, organo-metallic complex cross-linkers, amine carbamates, aluminum soaps, cocoamine (C12-C14), sebacoyl chloride, oley (C18) amine, toulen-2, 4-diisocyanate, tolune-2, 6-diisolcyanate.

The method further comprises adding a secondary fluid to the gelled enhanced recovery fluid. In some embodiments, the secondary fluid comprises at least one of aromatics, alkanes, and crude oil, and wherein the secondary fluid comprises 10% or less by volume of the gelled enhanced recovery fluid. In some embodiments, the aromatics comprise at least one of benzene, naphtha, xylene, toluene, fuel oils, olefins, and diesel. In some embodiments, the alkanes comprise at least one of heptane, octane, and hexane. In some embodiments, the crude oil comprises at least one of residual oil in the unconventional resource reservoir, medium oil, light oil, and condensate.

The method further comprises adding nanoparticles to the gelled enhanced recovery fluid.

In some embodiments, the method further comprises adding nitrogen to the gelled enhanced recovery fluid, wherein the nitrogen is liquid nitrogen sourced from an air separation device configured to separate nitrogen from air and supply the nitrogen to a nitrogen source. In some embodiments, the air separation device is an ECOGAN™ modular air separation plant with a liquification unit to create liquid nitrogen or other similar air separation unit.

In another embodiment, a method for enhanced or improved oil recovery, the method comprising injecting an unfractionated hydrocarbon mixture through an injection well into an unconventional resource reservoir, wherein the unfractionated hydrocarbon mixture is a byproduct of a condensed and de-methanized hydrocarbon stream that is miscible with hydrocarbons, wherein the unfractionated hydrocarbon mixture comprises ethane, propane, and butane in an amount of at least 75% by total volume, and wherein the unfractionated hydrocarbon mixture comprises pentane plus in an amount less than 25% by total volume. The method also includes producing hydrocarbons from the unconventional resource reservoir via the injection well or a production well offset from the injection well.

In some embodiments, the unfractionated hydrocarbon mixture is condensed out of the hydrocarbon stream at a temperature at or below 0 degrees Fahrenheit.

In some embodiments, the unfractionated hydrocarbon mixture comprises ethane in an amount of at least 3% by total volume.

In some embodiments, the injection well comprises an array of vertical or horizontal injection wells, and wherein the production well comprises an array of vertical or horizontal production wells offset from the array of injection wells.

In some embodiments, the injection well comprises a single horizontal or vertical well.

The method further comprises injecting a gas into the unconventional resource reservoir at the conclusion of the injection of the unfractionated hydrocarbon mixture. In some embodiments, the gas comprises natural gas, methane, ethane, LNG, nitrogen, carbon dioxide, or combinations thereof.

In some embodiments, the injection pressure of the unfractionated hydrocarbon mixture is between 0 psi to 10,000 psi.

The method further comprises adding nanoparticles to the unfractionated hydrocarbon mixture.

In another embodiment, a method of stimulating an unconventional hydrocarbon bearing reservoir comprises displacing an enhanced or improved recovery fluid with a displacing fluid. The displacing fluid comprises one or more of nitrogen, carbon dioxide, methane, ethane, LNG, natural gas, water, gelled water, or polymer water. The water may be formation water, brine, seawater or inhibited fresh water. The displacing fluids can be injected as a continuous slug or by alternating slugs of displacing fluid with the enhanced or improved recovery fluid. The displacing fluids can be injected at pressures up to and exceeding the subsurface formation fracture pressure.

The embodiments disclosed herein provide one or more of the following advantages: as Y-Grade NGL enters the unconventional resource reservoir it will begin to migrate into the hydraulic and natural fracture system and towards the offset production wells due to the lower pressure gradient as the result of pressure depletion from the withdrawal of fluids from the reservoir; as Y-Grade NGL continues to migrate through the hydraulic fractures and natural fractures of the unconventional resource reservoir it will permeate into the pore spaces, solubilize the hydrocarbons and kerogen, and expand thereby displacing additional trapped hydrocarbons held in place due to capillary forces; as Y-Grade NGL migrates through the unconventional resource reservoir it will lower the oil/gas interfacial tension and become enriched due to the evaporation of hydrocarbon intermediates (e.g. hexane's and heptane's) into the gas phase; Y-Grade NGL, surfactant, nitrogen, and water are combined to form a stable foam that can improve mobility and conformance of hydrocarbons in the unconventional resource reservoir.

In any of the embodiments where the injection well is shut in for a period of time or extended soak cycle to allow the enhanced recovery fluid to soak in the reservoir, the well may be shut in for several weeks or months and typically less than 6 months.

Any of the embodiments (in whole or in part) described herein can be used in combination with any other embodiment (in whole or in part) described herein.

While the foregoing is directed to certain embodiments, other and further embodiments may be devised without departing from the basic scope of this disclosure.

The invention claimed is:

1. A method for enhanced or improved hydrocarbon recovery, comprising:

injecting an enhanced or improved recovery fluid through an injection well into an unconventional resource reservoir at a pressure below the unconventional resource reservoir fracture pressure to mobilize and displace hydrocarbons, wherein the injection well of the unconventional resource reservoir has been previously hydraulically fractured and contains one or more sections of hydraulic fractures, wherein the enhanced or improved recovery fluid comprises an unfractionated hydrocarbon liquid mixture that is a byproduct of a condensed and de-methanized hydrocarbon stream that is miscible with hydrocarbons in the unconventional resource reservoir, wherein the unfractionated hydrocarbon mixture is condensed out of the hydrocarbon stream at a temperature at or below 0 degrees Fahrenheit, wherein the unfractionated hydrocarbon mixture comprises ethane, propane, and butane in an amount of at least 75% by volume, and wherein the unfractionated hydrocarbon mixture comprises pentane plus in an amount less than 25% by volume;

alternating slugs of the enhanced or improved recovery fluid into the unconventional resource reservoir with slugs of a gas;

injecting a final displacement fluid into the unconventional resource reservoir at the conclusion of the injection of the enhanced or improved recovery fluid and the gas at a pressure below the unconventional resource reservoir fracture pressure to mobilize the enhanced or improved recovery fluid and hydrocarbons in the unconventional resource reservoir; and producing hydrocarbons from the unconventional resource reservoir via the injection well or a production well offset from the injection well, wherein the injection well comprises an array of vertical or horizontal injection wells, and wherein the production well comprises an array of vertical or horizontal production wells offset from the array of injection wells.

2. The method of claim 1, wherein the final displacement fluid comprises at least one of a gas, water, and viscosified water.

3. The method of claim 1, wherein the enhanced or improved recovery fluid further comprises at least one of carbon dioxide, nitrogen, natural gas, LNG, methane, [ethane,] water, and viscosified water.

4. The method of claim 3, wherein the nitrogen is sourced in liquid form from an air separation plant, stored at the well site in liquid, then vaporized to gaseous form.

5. The method of claim 3, wherein the nitrogen is sourced in pressurized form from an air separation plant.

6. The method of claim 1, wherein the unconventional resource reservoir is a residual oil zone (ROZ).

7. The method of claim 1, further comprising adding a secondary fluid to the enhanced or improved recovery fluid, wherein the secondary fluid comprises at least one of aromatics, alkanes, and crude oil, and wherein the secondary fluid comprises 10% or less by volume of the enhanced or improved recovery fluid.

8. The method of claim 7, wherein the crude oil comprises at least one of residual oil in the unconventional resource reservoir, medium oil, light oil, and condensate.

9. The method of claim 1, further comprising adding nanoparticles to the enhanced or improved recovery fluid.

10. The method of claim 1, further comprising mixing the unfractionated hydrocarbon mixture with a surfactant and a gas to form a hydrocarbon foam as the enhanced or improved recovery fluid.

11. The method of claim 10, wherein the gas comprises at least one of nitrogen, carbon dioxide, methane, ethane, LNG, or natural gas.

12. The method of claim 11, wherein the nitrogen is sourced in liquid form from an air separation plant, stored at the well site in liquid form, then vaporized to gaseous form.

13. The method of claim 11, wherein the nitrogen is sourced in pressurized form from an air separation plant.

14. The method of claim 10, wherein the surfactant comprises at least one of an anionic surfactant and a nonionic surfactant.

15. The method of claim 14, *wherein the surfactant is a nonionic surfactant, and* wherein the nonionic surfactant comprises at least one of a siloxane surfactant, a fluorosurfactant, a fatty acid ester, a glyceride, a silicon emulsifier, and a hydrophobic silica powder, wherein the surfactant comprises a mass concentration of up to 5%.

16. The method of claim 10, further comprising adding a secondary fluid to the hydrocarbon foam, wherein the secondary fluid comprises at least one of aromatics, alkanes, and crude oil, and wherein the secondary fluid comprises 10% or less by volume of the hydrocarbon foam.

17. The method of claim 16, wherein the crude oil comprises at least one of residual oil in the unconventional resource reservoir, medium oil, light oil, and condensate.

18. The method of claim 10, further comprising adding nanoparticles to the hydrocarbon foam.

19. The method of claim 1, further comprising mixing the unfractionated hydrocarbon mixture with a surfactant, a gas, and water to form an emulsion based foam as the enhanced or improved recovery fluid.

20. The method of claim 19, wherein the surfactant acts as one or both of a foaming agent and an emulsifying agent.

21. The method of claim 19, wherein the water is formation water, brine, or seawater and comprises up to 25% of the liquid phase of the emulsion based foam.

22. The method of claim 19, wherein the water is potassium chloride water and comprises up to 25% of the liquid phase of the emulsion based foam, and wherein the potassium chloride water comprises up to 4% potassium chloride.

23. The method of claim 19, wherein the gas mixed with the unfractionated hydrocarbon mixture, the surfactant, and the water to form the emulsion based foam comprises at least one of nitrogen, carbon dioxide, natural gas, methane, LNG, and ethane.

24. The method of claim 23, wherein the nitrogen is liquid nitrogen sourced from an air separation device configured to separate nitrogen from air and supply the nitrogen to a nitrogen source.

25. The method of claim 24, wherein the air separation device is a modular air separation plant with a liquification unit to create liquid nitrogen.

26. The method of claim 19, wherein the surfactant comprises at least one of a nonionic surfactant, an anionic surfactant, and a cationic surfactant, and wherein the surfactant comprises a mass concentration of up to 5%.

27. The method of claim 26, wherein the nonionic surfactant comprises at least one of a siloxane surfactant, a fluorosurfactant, a fatty acid ester, a glyceride, a silicon emulsifier, and a hydrophobic silica powder.

28. The method of claim 22, further comprising adding a secondary fluid to the emulsion based foam, wherein the secondary fluid comprises 10% or less by volume of the emulsion based foam, wherein the secondary fluid comprises at least one of aromatics, alkanes, and crude oil.

29. The method of claim 28, wherein the crude oil comprises at least one of residual oil in the unconventional resource reservoir, medium oil, light oil, and condensate.

30. The method of claim 22, further comprising adding nanoparticles to the emulsion based foam.

31. The method of claim 1, further comprising mixing the unfractionated hydrocarbon mixture with an emulsifying agent and water to form an emulsion as the enhanced or improved recovery fluid.

32. The method of claim 31, further comprising simultaneously injecting the unfractionated hydrocarbon mixture, the emulsifying agent, and the water into the unconventional resource reservoir.

33. The method of claim 31, wherein the water comprises at least one of formation water, brine, and seawater, and comprises up to 25% of the liquid phase of the emulsion.

34. The method of claim 31, wherein the water is potassium chloride water and comprises up to 25% of the liquid phase of the emulsion, and wherein the potassium chloride water comprises up to 4% potassium chloride.

35. The method of claim 31, wherein the emulsifying agent is a surfactant, and wherein the surfactant comprises at least one of a nonionic surfactant, an anionic surfactant, and a cationic surfactant, and wherein the surfactant comprises a mass concentration of up to 5%.

36. The method of claim 35, *wherein the surfactant is a nonionic surfactant, and* wherein the nonionic surfactant comprises at least one of a siloxane surfactant, a fluorosurfactant, a fatty acid ester, a glyceride, a silicon emulsifier, and a hydrophobic silica powder.

37. The method of claim 31, further comprising adding a secondary fluid to the emulsion, wherein the secondary fluid comprises at least one of aromatics, alkanes, and crude oil, and wherein the secondary fluid comprises 10% or less by volume of the emulsion.

38. The method of claim 37, wherein the crude oil comprises at least one of residual oil in the unconventional resource reservoir, medium oil, light oil, and condensate.

39. The method of claim 31, further comprising adding nanoparticles to the emulsion.

40. The method of claim 31, further comprising adding a viscosifier to the emulsion, wherein the viscosifier comprises at least one of a hydrocarbon soluble co-polymer and a water soluble viscosifier, and wherein the water soluble viscosifer comprises at least one of water soluble co-polymers, polysaccarides, guar gum, viscoelastic surfactants, crosslinkers, cellulosic viscosifiers, and hydroxyethyl cellulose.

*41. A method for enhanced or improved hydrocarbon recovery, comprising:*

*injecting an unfractionated hydrocarbon liquid mixture through an injection well into an unconventional resource reservoir at a pressure below the unconventional resource reservoir fracture pressure to mobilize and displace hydrocarbons, wherein the injection well of the unconventional resource reservoir has been previously hydraulically fractured and contains one or more sections of hydraulic fractures, wherein the unfractionated hydrocarbon liquid mixture is a byproduct of a condensed and demethanized hydrocarbon stream that is miscible with hydrocarbons in the unconventional resource reservoir, wherein the unfractionated hydrocarbon liquid mixture is condensed out of the hydrocarbon stream at a temperature between −30 degrees Fahrenheit and −100 degrees Fahrenheit, wherein the unfractionated hydrocarbon liquid mixture comprises ethane, propane, and butane in an amount of at least 75% by volume on a gas basis, wherein the unfractionated hydrocarbon liquid mixture comprises pentane plus in an amount less than 25% by volume on a gas basis, wherein the unfractionated hydrocarbon liquid mixture comprises ethane in an amount within a range of 3-13 percent by volume on a gas basis, wherein the unfractionated hydrocarbon liquid mixture is sourced and transported from a separate processing facility that is located at a location remote from the unconventional resource reservoir, wherein the separate processing facility comprises at least one of a splitter facility, a gas plant, and a refinery, and wherein the unfractionated hydrocarbon liquid mixture is transported via pressure storage vessels from the separate processing facility to the unconventional resource reservoir;*

*wherein the injecting of the unfractionated hydrocarbon liquid mixture comprises at least in part one of:*

*injecting slugs of the unfractionated hydrocarbon liquid mixture with slugs of a gas, or*

*injecting a final displacement fluid into the unconventional resource reservoir;*

*and wherein the method further comprises:*

*shutting in the injection well after the injecting of either of the slugs or the final displacement fluid for a period of time to allow the unfractionated hydrocarbon liquid mixture to soak in the unconventional resource reservoir, wherein the period of time is less than 6 months; and*

*producing hydrocarbons from the unconventional resource reservoir via the injection well, wherein the injection well comprises one or more vertical or horizontal injection wells.*

*42. The method of claim 41, further comprising injecting the final displacement fluid into the unconventional resource*

*reservoir at the conclusion of the injection of the unfractionated hydrocarbon liquid mixture at a pressure below the unconventional resource reservoir fracture pressure to mobilize the unfractionated hydrocarbon liquid mixture and hydrocarbons in the unconventional resource reservoir, wherein the final displacement fluid comprises at least one of gas, water, and viscosified water.*

*43. The method of claim 42, wherein the final displacement fluid is a gas, and wherein the gas comprises natural gas, methane, ethane, vaporized LNG, nitrogen, carbon dioxide, or combinations thereof.*

*44. The method of claim 41, wherein the unfractionated hydrocarbon liquid mixture further comprises carbon dioxide, nitrogen, natural gas, LNG, methane, water, viscosified water, or combinations thereof.*

*45. The method of claim 41, wherein the unconventional resource reservoir is a residual oil zone (ROZ).*

*46. The method of claim 41, further comprising adding a secondary fluid to the unfractionated hydrocarbon liquid mixture, wherein the secondary fluid comprises 10% or less by volume of the unfractionated hydrocarbon liquid mixture, and wherein the secondary fluid comprises at least one of aromatics, alkanes, crude oil, and condensate.*

*47. The method of claim 41, further comprising adding nanoparticles to the unfractionated hydrocarbon liquid mixture.*

*48. The method of claim 41, wherein the unfractionated hydrocarbon mixture is configured to solubilize a portion of organic or inorganic material within the unconventional resource reservoir.*

*49. The method of claim 41, further comprising mixing the unfractionated hydrocarbon liquid mixture with a gas and a surfactant to form a hydrocarbon foam prior to injection into the injection well, wherein the gas comprises natural gas, methane, vaporized LNG, nitrogen, carbon dioxide, or combinations thereof, and wherein the surfactant comprises a nonionic surfactant, an anionic surfactant, a cationic surfactant, or combinations thereof, and wherein the surfactant comprises a mass concentration of up to 5%.*

*50. The method of claim 49, wherein the surfactant is a nonionic surfactant, and wherein the nonionic surfactant comprises a siloxane surfactant, a fluorosurfactant, a fatty acid ester, a glyceride, a silicon emulsifier, a hydrophobic silica powder, or combinations thereof.*

*51. A method for enhanced or improved hydrocarbon recovery, comprising:*

*mixing an unfractionated hydrocarbon liquid mixture with a gelling agent to form a gelled enhanced or improved recovery fluid, wherein the unfractionated hydrocarbon liquid mixture is a byproduct of a condensed and de-methanized hydrocarbon stream that is miscible with hydrocarbons, wherein the unfractionated hydrocarbon liquid mixture is condensed out of the hydrocarbon stream at a temperature between −30 degrees Fahrenheit and −100 degrees Fahrenheit, wherein the unfractionated hydrocarbon liquid mixture comprises ethane, propane, and butane in an amount of at least 75% by volume on a gas basis, wherein the unfractionated hydrocarbon liquid mixture comprises pentane plus in an amount less than 25% by volume on a gas basis, wherein the unfractionated hydrocarbon liquid mixture comprises ethane in an amount within a range of 3-13 percent by volume on a gas basis, wherein the unfractionated hydrocarbon liquid mixture is sourced and transported from a separate processing facility that is located at a location remote from an unconventional resource reservoir, wherein the separate processing facility comprises at least one of a splitter facility, a gas plant, and a refinery, and wherein the unfractionated hydrocarbon liquid mixture is transported via pressure storage vessels from the separate processing facility to the unconventional resource reservoir;*

*injecting the gelled enhanced or improved recovery fluid through an injection well into the unconventional resource reservoir at a pressure below the unconventional resource reservoir fracture pressure to mobilize and displace hydrocarbons, wherein the injection well of the unconventional resource reservoir has been previously hydraulically fractured and contains one or more sections of hydraulic fractures;*

*wherein the injecting of the gelled enhanced or improved recovery fluid comprises at least in part one of:*

*injecting slugs of the gelled enhanced or improved recovery fluid with slugs of a gas, or*

*injecting a final displacement fluid into the unconventional resource reservoir;*

*and wherein the method further comprises:*

*shutting in the injection well after the injecting of either of the slugs or the final displacement fluid for a period of time to allow the gelled enhanced or improved recovery fluid to soak in the unconventional resource reservoir, wherein the period of time is less than 6 months; and*

*producing hydrocarbons from the unconventional resource reservoir via the injection well, wherein the injection well comprises one or more vertical or horizontal injection wells.*

*52. The method of claim 51, further comprising injecting the final displacement fluid into the unconventional resource reservoir at the conclusion of the injection of the gelled enhanced or improved recovery fluid at a pressure below the unconventional resource reservoir fracture pressure to mobilize the gelled enhanced or improved recovery fluid and hydrocarbons in the unconventional resource reservoir, wherein the final displacement fluid comprises at least one of natural gas, methane, ethane, vaporized LNG, nitrogen, carbon dioxide, water, and viscosified water.*

*53. The method of claim 51, further comprising alternating the slugs of the gelled enhanced or improved recovery fluid into the unconventional resource reservoir with the slugs of the gas at a pressure below the unconventional resource reservoir fracture pressure to mobilize the gelled enhanced or improved recovery fluid and hydrocarbons in the unconventional resource reservoir, wherein the slugs of gas comprise natural gas, methane, ethane, vaporized LNG, nitrogen, carbon dioxide, or combinations thereof.*

*54. The method of claim 51, wherein the gelling agent comprises at least one of a hydrocarbon soluble copolymers, phosphate esters, organo-metallic complex cross-linkers, amine carbamates, aluminum soaps, cocoamine (C12-C14), sebacoyl chloride, oley (C18) amine, toulen-2, 4-diisocyanate, tolune-2, 6-diisolcyanate.*

*55. The method of claim 51, further comprising adding a secondary fluid to the gelled enhanced or improved recovery fluid, wherein the secondary fluid comprises 10% or less by volume of the gelled enhanced or improved recovery fluid, and wherein the secondary fluid comprises at least one of aromatics, alkanes, crude oil, and condensate.*

*56. The method of claim 51, further comprising adding nanoparticles to the gelled enhanced or improved recovery fluid.*

*57. The method of claim 51, wherein the gelled enhanced or improved recovery fluid is configured to solubilize a portion of organic or inorganic material within the unconventional resource reservoir.*

*58. The method of claim 51, wherein the unconventional resource reservoir is a residual oil zone (ROZ).*

*59. A method for enhanced or improved hydrocarbon recovery, comprising:*

*mixing an unfractionated hydrocarbon liquid mixture with an emulsifying agent and water to form an emulsified enhanced or improved recovery fluid, wherein the unfractionated hydrocarbon liquid mixture is a byproduct of a condensed and demethanized hydrocarbon stream that is miscible with hydrocarbons, wherein the unfractionated hydrocarbon liquid mixture is condensed out of the hydrocarbon stream at a temperature between −30 degrees Fahrenheit and −100 degrees Fahrenheit, wherein the unfractionated hydrocarbon liquid mixture comprises ethane, propane, and butane in an amount of at least 75% by volume on a gas basis, wherein the unfractionated hydrocarbon liquid mixture comprises pentane plus in an amount less than 25% by volume on a gas basis, wherein the unfractionated hydrocarbon liquid mixture comprises ethane in an amount within a range of 3-13 percent by volume on a gas basis, wherein the unfractionated hydrocarbon liquid mixture is sourced and transported from a separate processing facility that is located at a location remote from an unconventional resource reservoir, wherein the separate processing facility comprises at least one of a splitter facility, a gas plant, and a refinery, and wherein the unfractionated hydrocarbon liquid mixture is transported via pressure storage vessels from the separate processing facility to the unconventional resource reservoir;*

*injecting the emulsified enhanced or improved recovery fluid through an injection well into the unconventional resource reservoir at a pressure below the unconventional resource reservoir fracture pressure to mobilize and displace hydrocarbons, wherein the injection well of the unconventional resource reservoir has been previously hydraulically fractured and contains one or more sections of hydraulic fractures;*

*wherein the injecting of the emulsified enhanced or improved recovery fluid comprises at least in part one of:*

*injecting slugs of the emulsified enhanced or improved recovery fluid with slugs of a gas, or*

*injecting a final displacement fluid into the unconventional resource reservoir;*

*and wherein the method further comprises:*

*shutting in the injection well after the injecting of either of the slugs or the final displacement fluid for a period of time to allow the emulsified enhanced or improved recovery fluid to soak in the unconventional resource reservoir, wherein the period of time is less than 6 months; and*

*producing hydrocarbons from the unconventional resource reservoir via the injection well, wherein the injection well comprises one or more vertical or horizontal injection wells.*

*60. The method of claim 59, further comprising injecting the final displacement fluid into the unconventional resource reservoir at the conclusion of the injection of the emulsified enhanced or improved recovery fluid at a pressure below the unconventional resource reservoir fracture pressure to mobilize the emulsified enhanced or improved recovery fluid and hydrocarbons in the unconventional resource reservoir, wherein the final displacement fluid comprises at least one of natural gas, methane, ethane, vaporized LNG, nitrogen, carbon dioxide, water, and viscosified water.*

*61. The method of claim 59, further comprising alternating the slugs of the emulsified enhanced or improved recovery fluid into the unconventional resource reservoir with the slugs of the gas at a pressure below the unconventional resource reservoir fracture pressure to mobilize the emulsified enhanced or improved recovery fluid and hydrocarbons in the unconventional resource reservoir, wherein the slugs of gas comprise natural gas, methane, ethane, vaporized LNG, nitrogen, carbon dioxide, or combinations thereof.*

*62. The method of claim 59, further comprising adding a viscosifier to the emulsified enhanced or improved recovery fluid, wherein the viscosifier comprises at least one of a hydrocarbon soluble co-polymer and a water soluble viscosifier, and wherein the water soluble viscosifer comprises at least one of water soluble copolymers, polysaccarides, guar gum, viscoelastic surfactants, crosslinkers, cellulosic viscosifiers, and hydroxyethyl cellulose.*

*63. The method of claim 59, further comprising adding a secondary fluid to the emulsified enhanced or improved recovery fluid, wherein the secondary fluid comprises 10% or less by volume of the emulsified enhanced or improved recovery fluid, and wherein the secondary fluid comprises at least one of aromatics, alkanes, crude oil, and condensate.*

*64. The method of claim 59, further comprising adding nanoparticles to the emulsified enhanced or improved recovery fluid.*

*65. The method of claim 59, wherein the emulsified enhanced or improved recovery fluid is configured to solubilize a portion of organic or inorganic material within the unconventional resource reservoir.*

*66. The method of claim 59, wherein the unconventional resource reservoir is a residual oil zone (ROZ).*

*67. The method of claim 59, wherein the water comprises at least one of formation water, brine, and seawater, and comprises up to 25% of the liquid phase of the emulsified enhanced or improved recovery fluid.*

*68. The method of claim 59, wherein the water is potassium chloride water and comprises up to 25% of the liquid phase of the emulsified enhanced or improved recovery fluid, and wherein the potassium chloride water comprises up to 4% potassium chloride.*

*69. The method of claim 59, wherein the emulsifying agent is a surfactant, and wherein the surfactant comprises a nonionic surfactant, an anionic surfactant, a cationic surfactant, or combinations thereof, and wherein the surfactant comprises a mass concentration of up to 5%.*

*70. The method of claim 69, wherein the surfactant is a nonionic surfactant, and wherein the nonionic surfactant comprises a siloxane surfactant, a fluorosurfactant, a fatty acid ester, a glyceride, a silicon emulsifier, a hydrophobic silica powder, or combinations thereof.*

* * * * *